US006165946A

United States Patent [19]
Mueller et al.

[11] Patent Number: 6,165,946
[45] Date of Patent: *Dec. 26, 2000

[54] PROCESS FOR THE FACILITATED WASTE DISPOSAL OF WORKING SUBSTANCES BASED ON WATER-IN-OIL INVERT EMULSIONS

[75] Inventors: Heinz Mueller, Monheim; Claus-Peter Herold, Mettmann; Thomas Foerster; Stephan von Tapavicza, both of Erkrath; Johann-Friedrich Fues, Grevenbroich, all of Germany

[73] Assignee: Henkel Kommanditgesellschaft auf Aktien, Duesseldorf, Germany

[*] Notice: This patent is subject to a terminal disclaimer.

[21] Appl. No.: 09/297,481

[22] PCT Filed: Oct. 21, 1997

[86] PCT No.: PCT/EP97/05798

§ 371 Date: Apr. 30, 1999

§ 102(e) Date: Apr. 30, 1999

[87] PCT Pub. No.: WO98/18882

PCT Pub. Date: May 7, 1998

[30] Foreign Application Priority Data

Oct. 30, 1996 [DE] Germany ............ 196 43 840
Aug. 4, 1997 [DE] Germany ............ 197 33 710

[51] Int. Cl.$^7$ .............. C09K 3/00; E21B 21/00
[52] U.S. Cl. ............ 507/203; 507/211; 507/234; 507/244; 507/245; 507/260; 507/261; 507/265; 507/266; 507/268; 507/927; 166/311; 166/312
[58] Field of Search .................. 507/203, 211, 507/234, 244, 245, 260, 261, 265, 266, 268, 927; 166/311, 312

[56] References Cited

U.S. PATENT DOCUMENTS

| | | |
|---|---|---|
| 3,977,472 | 8/1976 | Graham et al. ............ 166/311 |
| 4,457,373 | 7/1984 | Balzer et al. ............ 166/311 |
| 4,582,138 | 4/1986 | Balzer ............ 166/273 |
| 4,705,110 | 11/1987 | Balzer ............ 166/274 |
| 4,722,396 | 2/1988 | Balzer ............ 507/927 |
| 5,068,041 | 11/1991 | Patel et al. ............ 507/103 |
| 5,106,516 | 4/1992 | Mueller et al. ............ 507/138 |
| 5,117,590 | 6/1992 | Kudo et al. ............ 51/283 |
| 5,189,012 | 2/1993 | Patel et al. ............ 507/103 |
| 5,232,910 | 8/1993 | Mueller et al. ............ 507/138 |

(List continued on next page.)

FOREIGN PATENT DOCUMENTS

| | | |
|---|---|---|
| 2068129 | 11/1992 | Canada . |
| 1 334 458 | 2/1995 | Canada . |
| 0 047 370 | 3/1982 | European Pat. Off. . |
| 0 117 970 | 9/1984 | European Pat. Off. . |
| 0 213 321 | 3/1987 | European Pat. Off. . |
| 0 354 586 | 2/1990 | European Pat. Off. . |
| 0 374 671 | 6/1990 | European Pat. Off. . |
| 0 374 672 | 6/1990 | European Pat. Off. . |
| 0 382 070 | 8/1990 | European Pat. Off. . |
| 0 382 071 | 8/1990 | European Pat. Off. . |
| 0 386 636 | 9/1990 | European Pat. Off. . |
| 0 386 638 | 9/1990 | European Pat. Off. . |
| 0 391 251 | 10/1990 | European Pat. Off. . |
| 0 391 252 | 10/1990 | European Pat. Off. . |
| 0 512 501 | 11/1992 | European Pat. Off. . |
| 0 521 981 | 1/1993 | European Pat. Off. . |
| 0 532 570 | 3/1993 | European Pat. Off. . |

(List continued on next page.)

OTHER PUBLICATIONS

Journal Petroleum Technology, New Base Oil Used in Low–Toxicity Oil Muds, 1985 pp. 137–142.
Journal Petroleum Technology, New Drilling Fluid Tech., (1984) pp. 975–981.
Phase Properties of Emulsion:PIT and HLB, vol. 1, (1983) pp. 337–367.
International Journal of Cosmetic Science, vol. 16, (1994) pp. 84–92.
The Royal Society of Chemistry, Chapter 4, Nonionics, pp. 139–317, No Date Available.
Derwent Patent Abstract (WPAT) No. 87–065778/10, 1987.
Derwent Patent Abstract (WPAT) No. 84–226215/37, 1984.
Derwent Patent Abstract (WPAT) No. 89–364978/50, 1989.
Derwent Patent Abstract (WPAT) No. 92–269753/33, 1992.
Derwent Patent Abstract (WPAT) No. 92–080060/10, 1992.
Derwent Patent Abstract (WPAT) No. 90–194905/26, 1990.
Derwent Patent Abstract (WPAT) No. 90–194333/26, 1990.
Derwent Patent Abstract (WPAT) No. 90–276696/37, 1990.
Derwent Patent Abstract (WPAT) No. 90–276694/37, 1990.
Derwent Patent Abstract (WPAT) No. 90–248038/33, 1990.
Derwent Patent Abstract (WPAT) No. 90–248039/33, 1990.
Derwent Patent Abstract (WPAT) No. 90–306702/41, 1990.
Derwent Patent Abstract (WPAT) No. 90–306701/41, 1990.
Derwent Patent Abstract (WPAT) No. 91–369999/51, 1991.
Derwent Patent Abstract (WPAT) No. 92–024393/03, 1992.
Derwent Patent Abstract (WPAT) No. 92–374815/46, 1992.
Derwent Patent Abstract (WPAT) No. 90–046295/07, 1990.
Derwent Patent Abstract (WPAT) No. 91–296733/41, 1991.

*Primary Examiner*—Philip Tucker
*Attorney, Agent, or Firm*—John E. Drach; Glenn E.J. Murphy; Steven J. Trzaska

[57] ABSTRACT

The invention relates to a process for facilitating the disposal of flowable and pumpable working fluids based on emulsifiers containing W/O invert emulsions—more particularly corresponding auxiliaries of the type used in geological exploration, such as oil-based w/o invert drilling muds—and for the simplified cleaning of solid surfaces soiled therewith, if desired using flowable spraying aids, the process being characterized in that, by selecting and adapting the emulsifiers/emulsifier systems to the oil phase of the invert emulsion, temperature-controlled phase inversion is achieved at temperatures below the in-use temperatures of the w/o invert emulsions, but above the freezing point of the aqueous phase and in that disposal and cleaning are carried out at temperatures in and/or below the phase inversion temperature range. The invention also relates to the use of this process for the cleaning and disposal of roc cuttings covered with residual drilling mud from geological exploration during and/or preferably before their on-shore or off-shore dumping

70 Claims, No Drawings

U.S. PATENT DOCUMENTS

| | | | |
|---|---|---|---|
| 5,252,554 | 10/1993 | Mueller et al. | 507/138 |
| 5,254,531 | 10/1993 | Mueller et al. | 507/131 |
| 5,318,954 | 6/1994 | Mueller et al. | 507/138 |
| 5,318,955 | 6/1994 | Mueller et al. | 507/139 |
| 5,348,938 | 9/1994 | Mueller et al. | 507/139 |
| 5,401,425 | 3/1995 | Prukop | 507/200 |
| 5,403,822 | 4/1995 | Mueller et al. | 507/138 |
| 5,441,927 | 8/1995 | Mueller et al. | 507/138 |
| 5,461,028 | 10/1995 | Mueller et al. | 507/138 |
| 6,022,833 | 2/2000 | Mueller | 507/203 |

FOREIGN PATENT DOCUMENTS

| | | |
|---|---|---|
| 0 535 074 | 4/1993 | European Pat. Off. . |
| 0 627 481 | 12/1994 | European Pat. Off. . |
| 38 19 193 | 12/1989 | Germany . |
| 2258258 | 2/1993 | United Kingdom . |
| WO92/02594 | 2/1992 | WIPO . |
| WO92/13926 | 8/1992 | WIPO . |
| WO93/16145 | 8/1993 | WIPO . |
| WO94/14919 | 7/1994 | WIPO . |
| WO95/30643 | 11/1995 | WIPO . |
| WO95/32260 | 11/1995 | WIPO . |

PROCESS FOR THE FACILITATED WASTE DISPOSAL OF WORKING SUBSTANCES BASED ON WATER-IN-OIL INVERT EMULSIONS

This application is filed under 35 U.S.C. 371 and based on PCT/EP97/05798, filed Oct. 21, 1997.

BACKGROUND OF THE INVENTION

1. Field of the Invention

This invention relates to a process for facilitating the disposal of flowable and pumpable working fluids based on emulsifier-containing w/o invert emulsions and for the simplified cleaning of solid surfaces soiled therewith using water-based washing aids. In the following description of the invention, the elements of the teaching according to the invention are described with reference to flowable and pumpable fluids for use in geological exploration, more particularly corresponding well servicing fluids, which contain an oil phase and an aqueous phase using emulsifiers. As a characteristic example of servicing fluids of this type, the invention is described in the following with reference to drilling fluids and drilling muds based thereon. However, the modified auxiliary fluids according to the invention are by no means confined to this particular field of application. Related applications covered by the invention include, for example, spotting fluids spacers, packer fluids, auxiliary fluids for workover and stimulation and for fracturing The use of the teaching according to the invention is of particular importance for the development, particularly the offshore development, of oil and gas occurrences, but is by no means confined to this particular application The new teaching may also be generally used in land-supported drilling operations, for example in geothermal drilling, water drilling, geoscientific drilling and mine drilling.

2. Discussion of Prior Art

It is known that drilling fluids for sinking wells in rock and bringing up the rock cuttings are flowable systems thickened to a limited extent which may be assigned to any of the following three classes:

Purely aqueous drilling fluids, oil-based drilling fluids, which are generally used in the form of so-called invert emulsion muds, and water-based ohm emulsions which contain a heterogeneous finely disperse oil phase in the continuous aqueous phase.

Drilling fluids with a continuous oil phase are generally formulated as three-phase systems: oil, water and fine-particle solids. The aqueous phase is heterogeneously and finely dispersed in the continuous oil phase. Several additives are used, including in particular emulsifiers, weighting additives, fluid loss additives, alkali reserves, viscosity regulators, water-soluble salts and the like. Relevant particulars can be found in the Article by P. A Boyd et al. entitled "New Base Oil Used in Low-Toxicity Oil Muds" in Journal of Petroleum Technology, 1985, 137 to 142 and in the Article by R. B. Bennett entitled "New Drilling Fluid Technology—Mineral Oil Mud" in Journal of Petroleum Technology, 1984, 975 to 981 and the literature cited therein.

Even today, oil-based w/o invert systems are undoubtedly the safest fluids, particularly for drilling through water-sensitive clay layers. The continuous oil phase of the w/o invert emulsion forms a continuous semi-permeable membrane on the surface of the drilled layers of rock and the cuttings introduced into the drilling fluid so that potential diffusions of water can be direction-controlled. The optimization of the working result achieved by using w/o invert fluids has never been matched by any other type of drilling fluid. However, the use of these working media also presents considerable problems from the point of view of their disposal and the possible pollution of the environment which this involves. This applies in particular to large-scale applications, such as offshore drilling where drill cuttings covered with considerable residues of the w/o invert muds accumulate in large quantities. In offshore drilling operations, these cuttings have hitherto been dumped overboard.

Drilling fluids of the type just mentioned and other well servicing fluids of comparable composition originally used mineral oil fractions as the oil phase. Considerable environmental pollution can thus be caused if, for example, the drilling muds enter the environment either directly or through the drilled rock. Mineral oils are not readily biodegradable and, anaerobically, are virtually non-degradable and, for this reason, may be regarded as long-term pollution. In the last decade in particular, various proposals have been put forward by experts with a view to replacing the mineral oil fractions by ecologically safer and more readily degradable oil phases. Applicants describe possible alternatives for the oil phase, including mixtures of such replacement oils, in a relatively large number of patents and patent applications. The documents in question describe in particular selected oleophilic monocarboxylic add esters, polycarboxylic acid esters, at least substantially water-insoluble alcohols which flow freely under working conditions, corresponding ethers and selected carbonic and esters, cf. EP 0 374 671, EP 0 374 672, EP 0 386 638, EP 0 386 636, EP 0 382 070, EP 0 382 071, EP 0 391 252, EP 0 391 251, EP 0 532 570, EP 0 535 074.

However third parties have also put forward various proposals for alternative oil phases for the field of application in question. For example, the following classes of compounds have been proposed as a replacement for mineral oils in w/o invert muds: acetals, α-olefins (LAO), poly-α-olefins (PAO), internal olefins (IO), (oligo)amides, (oligo)imides and (oligo)ketones, cf. EP 0 512 501, EP 0 627 481, GB 2,258,258, U.S. Pat. No. 5,068,041, U.S. Pat. No. 5,189,012 and WO 95130643 and WO 95132260.

Today, various alternative oil phases for the field of application targeted by the invention are used in practice. Nevertheless, there is still a need for better balancing of the three key parameters for efficient technical procedure: optimized technological working result, optimized control of the ecological problem area and, finally, optimization of the cost/effectiveness ratio.

The problem addressed by the invention and the concept of its technical solution The problem addressed by the present invention in its broadest version was to provide a new concept which would enable the overall result to be optimized as required on the basis of the extensive technical knowledge which exists today in the field of application targeted by the present invention. High technical efficiency would be achievable in a reasonable cost/effectiveness ratio and, at the same time, current ecological requirements would be optimally satisfied. This concept is formulated as a broad working principle which, with the aid of expert knowledge, may be varied and thus optimally adapted to the particular application envisaged in numerous specific embodiments.

According to the invention, the technical solution for this broad concept lies in the combination of the following working elements:

The composition of the free-flowing and pumpable water- and oil-based multicomponent mixture ensures that, under the particular in-use conditions particularly in endangered rock formations within the well, the w/o invert mud is formed with the disperse aqueous phase in the continuous oil phase.

Away from endangered rock formations and, above all, in the working up and elimination of cuttings covered with residues of fluid, phase reversal is possible to form a water-based otw emulsion.

The following desirable working results can thus be obtained in combination:

In the working range and particularly in endangered rock formations, the fluid is present as a w/o invert emulsion which, in known manner, forms the required seal on the surface of the rock in the form of a semipermeable membrane. Optimal well stability can thus be achieved.

At the same time, however, the element of the invention of controlled phase reversal to an o/w emulsion with a continuous aqueous phase and a disperse oil phase, as explained hereinafter, makes the rock cuttings separated from the circulated drilling fluid easier to work up and eliminate, as known to the expert. At least the predominant part of the oil phase present in dispersed form can easily be rinsed off the cuttings either by separate washing or even simply by dumping in seawater in the case of offshore drilling, depending on the eco compatibility of the oil phase. The disperse oil phase can be separated from the washing liquid or is accessible to simplified aerobic degradation at the surface of the seawater.

The teaching according to the invention puts this principle of phase inversion into practice by using a working parameter involved in the circulation of the drilling fluid, namely the temperature of the drilling fluid at the particular point of use. Inside the well, the temperatures increase rapidly with increasing depth. The heated drilling fluid containing the hot cuttings also leaves the well with considerably elevated temperatures. By controlling and adjusting predetermined phase reversal temperatures, the desired reversal of the w/o invert phase to the o/w emulsion phase can now be achieved outside the well anywhere where such phase reversal is desirable or even necessary for technical reasons. This applies in particular to the simplified elimination of those constituents of the oil or mud which adhere to the cuttings present outside the borehole and separated from the drilling mud and which are to be subjected to simple and inexpensive disposal. The phase reversal according to the invention of the w/o invert phase originally present to the o/w emulsion phase opens up the critical access in this regard.

Particulars of this phase reversal can be found in the following. The parameter of the phase inversion temperature (PIT) selected in accordance with the invention and thus determined in advance in the particular drilling fluid ensures that the circulated drilling fluid is in the required state of a w/o invert emulsion during the drilling process.

Scientific background to the teaching according to the invention

It is known that emulsifiers or emulsifier systems are used to homogenize immiscible oiltwater phases by emulsification. The following general knowledge is relevant in this regard: emulsifiers are compounds which, in their molecular structure, link hydrophilic and lipophilic elements to one another. The choice and extent of the particular units in the emulsifier molecule or emulsifier system in question are often characterized by the HLB value which makes a statement about the hydrophilic/lipophilic balance.

Normally, the emulsifiers or emulsifier systems with—comparatively—strongly hydrophilic components lead to high HLB values and, in practice, generally to the water-based o/w emulsions with a disperse oil phase. Emulsifiers or emulsifier systems with—comparatively—strongly lipophilic components lead to comparatively low HLB values and hence to the w/o invert emulsion with a continuous oil phase and a disperse water phase.

However, this description is highly simplified:

The effect of the emulsifiers or emulsifier systems used can be influenced and hence altered by a number of accompanying factors in the mixture as a whole. In the context of the present invention, known parameters for these modifications include in particular the charging of the aqueous phase with soluble organic and/or inorganic components, for example water-soluble, more particularly polyhydric lower alcohols and/or oligomers thereof, soluble inorganic and/or organic salts, the quantity ratio of emulsifier/emulsifier system to the quantity of oil and, finally, constitutional coordination in the composition of the emulsifier/emulsifier system on the one hand and th molecular structure of the oil phase on the other hand.

A particularly significant parameter in the context of the teaching according to the invention for the specific emulsifier effect in regard to formation of the o/w or w/o emulsion can be the particular temperature of the multicomponent system. At least partly nonionic emulsifiers/emulsifier systems in particular show this effect of pronounced dependence on temperature in mixtures of oil and water phases insoluble in one another.

The above-mentioned system parameter of the phase inversion temperature (PIT) is thus crucially important. In cooperation with the other system parameters mentioned above, the emulsifiers/emulsifier systems used lead to the following emulsion associations:

System temperatures below the PIT form the o/w emulsion while system temperatures above the PIT form the w/o invert emulsion. The system is phase-inverted by shifting the temperature into the other temperature range.

The teaching according to the invention makes use of this and, hence, of the natural variation in this parameter:

In the hot interior of the well, the w/o invert state with a continuous oil phase is guaranteed through the choice of suitable emulsifiers/emulsifier systems in conjunction with the other variables to be taken into account here. In the comparatively cold outside environment, the drilling fluid can be phase-inverted simply by lowering the temperature below the PIT of the system, so that components to be removed are easier to work up. The heat effect which always accompanies the in-rock circulation of the drilling fluid ensures the required high temperature range above the PIT of the system at the hot rock surface and thus renders it neutral to the disperse water component of the drilling fluid in this region.

Before the details of the technical teaching according to the invention are discussed, important relevant literature and expert knowledge of the phenomenon of temperature-dependent phase inversion and the associated parameter of the phase inversion temperature (PIT) are summarized in the following. In the light of this basic knowledge available to the general public, the teaching according to the invention will readily be understood and can be put into practice.

A very detailed account of the phase equilibria of three-component systems of an aqueous phase/oil phase/surfactant (more particularly nonionic emulsifiers/emulsifier systems) can be found in the publication by K. SHINODA and H. KUNEIDA entitled "Phase Properties of Emulsions; PIT and HLB" in "Encyclopedia of Emulsion Technology", 1983, Vol. 1, 337 to 367. The authors also include above all the extensive relevant prior-art literature in their publication, knowledge of the dependence on temperature of the phase inversion of such emulsifier-containing oil/water systems being particularly important for understanding the teaching according to the invention as described in the following. The cited publication of SHINODA et al. discusses in detail this temperature parameter and the effects triggered by its variation in the multiphase system. Above all, however, reference is also made to earlier expert knowledge, cf. for example the earlier publications of K SHINODA et al—numbers 7 to 10 in the list of references (loc. cit., pages 3661367) Here SHINODA describes the parameter of the phase inversion temperature (PIT, HLB temperature), the dependence on temperature of the particular system using nonionic emulsifiers being given particular emphasis in the earlier publications of SHINODA et al.—numbers 7 and 8 in the list of references Free-flowing mixtures based on the three-component systems of oil/water/emulsifier are discussed above all in regard to the dependence of the particular phase equilibrium states established upon the temperature of the multicomponent system. The o/w emulsion state with a disperse oil phase in the continuous water phase which is stable at comparatively low temperatures inverts when the temperature is increased to the phase inversion range (PIT or "middle phase" range). In the event of a further increase in temperature, the multicomponent system inverts to the stable w/o invert state in which the water phase is dispersed in the continuous oil phase.

In his list of references (loc. cit., references 31 and 32), SHINODA refers to earlier works of P. A WINSOR. In the text of his previously cited publication (pages 344 to 345), the phase equilibrium codes coined by WINSOR, namely WINSOR I, WINSOR III and WINSOR II, are related to the temperature-dependent stable phases o/w—middle phase—w/o: WINSOR I is the stable water-based o/w phase, WINSOR II corresponds to the stable invert phase of the w/o type and WINSOR III denotes the middle phase and thus corresponds to the phase inversion temperature (PIT) range as it is now known both generally and in the context of the teaching according to the invention.

These various phases and, in particular, the (microemulsion) middle phase (WINSOR ll) of the particular system may be determined in two ways which it is advisable to combine with one another
a) Determination of the dependence on temperature and the associated phase displacement by experimental testing of the system, more particularly by conductivity measurement.
b) The PIT of the particular system in question can be calculated in advance on the basis of expert knowledge.

Basically, the following applies in this regard: the phenomenon of phase inversion and the associated phase inversion temperature (PIT) take place in a temperature range which is limited at its lower end with respect to the o/w emulsion state and, at its upper end, with respect to the w/o invert emulsion state. Experimental testing of the particular system, in particular by conductivity measurement at rising and/or falling temperatures, provides figures for the particular PIT lower limit and PIT upper limit—again with the possibility of slight displacements if the conductivity is measured on the one hand at rising temperatures and on the other hand at falling temperatures. To this extent, the phase inversion temperature (PIT) or, better stated, the PIT range agrees with the definition of the previously explained WINSOR III (microemulsion) middle phase. However The interval between the PIT lower limit (limitation with respect to o/w) and the PIT upper limit (limitation with respect to w/o invert) is generally a controllable temperature range which is comparatively limited through the choice of suitable emulsifier components or systems. In many cases, the temperature limits in question differ by less than 20 to 30° C. and, more particularly, by no more than 10 to 15° C. The teaching according to the invention can make use of this if the invert fluid—or separated components thereof—is to be clearly converted into the o/w emulsion state. However, for certain embodiments which will be described hereinafter, it can be of interest to use comparatively broad temperature ranges for phase inversion as long as it is ensured that, in the working temperature range in which the drilling fluid is used in the earth's interior, the upper limit of this PIT range (establishment of the w/o invert state) is not only reached, but preferably is comfortably exceeded.

By contrast calculation of the PIT of the particular system in question according to b) does not lead to exact determination of the above-mentioned temperature limits of the particular PIT range, but instead to a figure lying in the order of magnitude of the PIT range actually occurring in practice. This explains why it can be advisable in practice to combine the phase shift determinations according to a) and b). The following observations apply in this regard The experimental conductivity measurement of the system shows optimal conductivity for the water-based o/w fluid, but generally no conductivity for the w/o invert phase. If the conductivity of an emulsion sample is measured at various temperatures (rising and/or falling) in the phase inversion temperature range, the temperature limits between the three ranges mentioned, o/w-middle phase-w/o, can be numerically determined very accurately. The following observations apply in regard to the conductivity or non-existent conductivity of the two limiting ranges: between these two ranges lies the phase inversion temperature range of the particular system of which the lower limit (conductive) and upper limit (non-conductive) can be exactly determined.

This experimental determination of the phase inversion temperature range by conductivity measurements is described in detail in the relevant prior art literature, cf. for example the disclosures of EP 0 354 586 and EP 0 521 981. The ohw emulsions cooled below the phase inversion temperature range were found to have an electrical conductivity of more than 1 mSiemens per cm (mS/cm). A conductivity graph is prepared by slow heating under predetermined program conditions. The temperature range in which conductivity falls to values below 0.1 mS/cm is recorded as the phase inversion temperature range. For the purposes of the teaching according to the invention, a corresponding conductivity graph is also prepared for falling temperatures. In this case, conductivity is determined using a multicomponent mixture which, initially, was heated to temperatures above the phase inversion temperature range and thereafter was cooled in a predetermined manner The upper and lower limits thus determined for the phase inversion temperature range do not have to be identical with the corresponding values of the previously described determination section with rising temperatures of the multicomponent mixture. In general, however, the respective limits are so close to one another that standardized values can be used for industrial purposes (in particular by averaging the associated limits). However, the practicability of the technical teaching described in detail in the following is guaranteed from the working principles used here even for the case where significant differences in the limits of the phase inversion temperature range are measured on the one hand during determination at rising temperatures and on the other hand during determination at falling temperatures. The components of the multicomponent system have to be adapted to one another in their working parameters and effects in such a way that the working principle according to the invention as described in the foregoing can be put into practice: in the hot interior of the rock borehole, the w/o invert state with continuous oil phase is guaranteed. In the comparatively cold outside environment, the drilling mud can be phase-inverted by lowering the temperature below the PIT so that the components to be separated off are easier to work up.

To reduce the amount of work involved in the experiments, it can be useful to calculate the PIT of the particular multicomponent system. However, the same also applies in particular to potential optimizations in the choice of the emulsifiers or emulsifier systems and their adaptation to the selection and mixing of the aqueous phase on the one hand and the type of oil phase on the other hand in dependence upon other aspects of technical procedure. Relevant expert knowledge has been developed just recently from, basically, totally different fields, more particularly from the production of cosmetics. According to the present invention, this generally valid expert knowledge is now also being applied to the field of geological exploration and to the treatment of existing rock bores with systems containing optimized oil and water phases Particular reference is made in this connection to the Article by T H. FORSTER, W VON RYBINSKI, H. TESMANN and A WADLE "Calculation of Optimum Emulsifier Mixtures for Phase Inversion Emulsification" in International Journal of Cosmetic Science 16, 84–92 (1994). The Article in question contains a detailed account of how the phase inversion temperature (PIT) range of a given three-component system of an oil phase, a water phase and an emulsifier can be calculated by the CAPICO method (calculation of phase inversion in concentrates) on the basis of the EACN value (equivalent alkane carbon number) characteristic of the oil phase. More particularly, this Article by FORSTER et al. cites important literature for the field targeted by the invention, cf. pages 91 and 92 loc. cit. in conjunction with the actual disclosure of the Article. With the aid of numerous examples, it is shown how the choice and optimization of the emulsifiers/emulsifier systems are accessible to the adjustment of optimal predetermined values for the phase inversion temperature range by the CAPICO method in conjunction with the EACN concept.

On the basis of this fundamental knowledge, mixtures of which the PIT is within the range according to the invention and corresponding mixing ratios can be determined in advance for the components intended for practical use, more particularly the oil phase and associated emulsifiers/emulsifier systems (type and quantity). A first useful basis for carrying out experiments on the lines of method a) is thus established. Over and above calculation of the PIT, it is possible in particular to determine the lower and, above all, upper limits of the range in which the middle phase is formed. The temperature limits above which lies the w/o invert range for the drilling mud in direct contact with the hot inner wall of the well for formation of the continuous semipermeable membrane are thus clearly laid down. In general, it is advisable in practice (see the following explanations of the teaching according to the invention) to select and guarantee this upper limit of the phase inversion temperature range with an adequate safety margin in order to ensure the w/o invert phase required in the hot region.

On the other hand, the temperature should be able at lower values to fall below the w/o invert limit to such an extent that use can be made of the advantages of phase reversal up to the o/w phase and the easier working up of the separated components of the drilling mud to which this generally leads.

To complete the review of relevant expert knowledge, reference is made to the following: in recent years, considerable efforts have been made by researchers to improve so-called enhanced oil recovery by flooding oil-containing rock layers with o/w emulsions containing emulsifiers/emulsifier systems. The goal has been in particular to use corresponding systems for the middle emulsion phase (WINSOR III) within the formation. This will immediately become clear from the opposing objective deviating from the teaching according to the invention: optimization of the o/w-w/o equilibrium to form the microemulsion phase in the multicomponent system leads to an increase in the effectiveness of the washing process required in flooding and hence to an increase in the washing out of the oil phase from the rock formation. It is crucially significant in this regard that, by virtue of the microemulsion state, the unwanted blockage of pores in the rock by relatively large oil droplets can be safely prevented.

The objective of the invention is the opposite of this step of enhanced oil recovery by flooding:

The object of the teaching according to the invention in using w/o invert emulsions is to seal the porous surface of rock formations in the well by the continuous oil layer. At the same time, however, the invention seeks to achieve easier disposal of the drilling mud or rather components thereof by phase inversion outside the well.

DESCRIPTION OF THE INVENTION

The subject of the invention

In a first embodiment, therefore, the present invention relates to a process for facilitating the disposal of flowable and pumpable working fluids based on emulsifier-containing W/O invert emulsions—more particularly corresponding auxiliaries of the type used in geological exploration, such as oil-based w/o invert drilling muds—and for the simplified cleaning of solid surfaces soiled therewith, if desired using flowable spraying aids, characterized in that, by selecting and adapting the emulsifiers/emulsifier systems to the oil phase of the invert emulsion, temperature-controlled phase inversion is achieved at temperatures below the in-use temperatures of the w/o invert emulsions, although at the same time this temperature-controlled phase inversion takes place above the freezing point of the aqueous phase. The invention is also characterized in that disposal and cleaning are carried out at temperatures in and/or below the phase inversion temperature range.

In addition, in preferred embodiments, the cooling of the soiled solid material or at least the cooling of the invert emulsion to be removed to the phase inversion temperature range (PIT) takes place before and/or during the cleaning of the soiled solid surfaces. At the same time, solids, particularly coarse-particle solids, are at least largely separated under the effect of increased gravity from parts of the material to be cleaned which are flowable and pumpable at the working temperature. In addition, the washing of the soiled solid surfaces can be carried out with water-based washing aids, more particularly with cold water of which the temperature is below the PIT range of the emulsion residues to be washed off. This washing process may be accelerated in particular by application of mechanical energy so that washing stages of limited duration can be used. Relevant particulars will follow.

In another embodiment, the teaching according to the invention relates in particular to the use of the described process for the simplified cleaning and disposal of rock cuttings covered with residual drilling mud during and/or preferably before their on-shore or off-shore dumping.

Further particulars of the teaching according to the invention

This description of the concept according to the inventon and its technical solution shows that the choice of suitable emulsifiers or emulsifier systems and their adaptation to the other working parameters are crucially important. Emulsifiers or emulsifier systems particularly suitable for this purpose are those which are at least partly and, preferably, at least predominantly nonionic in structure and/or which link both nonionic structural elements and anionic structural elements to one another in the basic molecular structure of the emulsifiers/emulsifier systems.

Although implementation of the working principle according to the invention is not confined to the use of nonionic emulsifiers or emulsifier systems, the general and preferred embodiments of the teaching according to the invention discussed in the following are described above all with reference to the use of nonionic emulsifiers/emulsifier systems. Nonionic emulsifiers/emulsifier systems are also particularly suitable for the practical implementation of the principle according to the invention. The influence of salts in the aqueous phase, more particularly salts of polyvalent cations, on the emulsifying effect of nonionic emulsifiers is comparatively weak However, the use of such salt-containing aqueous phases in the invert drilling fluid can be of practical importance for regulating the equilibrium of the osmotic pressures between the drilling fluid on the one hand and the liquid phase in the surrounding rock on the other hand. Nonionic emulsifiers/emulsifier systems can be used as flowable components for preferred embodiments of the teaching according to the invention, even at room temperature or slightly elevated temperatures. The range of suitable nonionic emulsifiers is so broad and available from chemicals of both natural and synthetic origin that ecologically compatible and, in particular, aquatoxicologically optimized emulsifier systems can be used. At the same time, the key components are inexpensively obtainable. However, the main reason why nonionic emulsifier components are preferably used in accordance with the invention lies in the pronounced temperature dependence on the PIT in the particular oil system which can be additionally controlled through the quantity ratios of the oil phase to the emulsifiers/emulsifier components in the mixture (cf the above-cited article by Förster et al.). in preferred embodiments of the teaching according to the invention, the emulsifiers/emulsifier systems are adapted to the various other parameters involved in the composition of the drilling fluid in such a way that the PIT of the multicomponent mixture lies in a temperature range which, as its lower limit, allows cold washing of the solid surfaces to be cleaned with an aqueous phase. As already briefly discussed, drilling fluids of the type in question normally contain an aqueous phase which itself may contain considerable quantities of dissolved organic and/or inorganic auxiliaries, for example soluble salts for adjusting and regulating the pressure equalization of the water phases competing with one another and their osmotic pressures on to one hand in the surrounding rock of the well and on the other hand in the drilling fluid. The solidification temperatures of these aqueous phases, for example salt-containing aqueous phases, can be distinctly below 0° C., for example in the range from −10 to −20° C. However, a preferred lower limit for the PIT or the PIT range of the multicomponent mixture is above 0 to 5° C. and more particularly in the range from 10 to 15° C. and may even be 20° C. The practical significance of these comparatively low limits for the determination of the PIT range at its lower end is discussed in the following in conjunction with preferred embodiments of the teaching according to the invention.

The following general and preferred observations apply to the determination of the upper limit to be imposed in accordance with the invention on the temperature range in which phase inversion takes place on cooling:

The upper limit to the temperature range in which phase inversion is initiated should be sufficiently remote from the stable w/o invert emulsion range Accordingly, it is advisable for the upper limit to the phase inversion temperature range to be at least 3° C. to 5° C. below the working temperature of the multicomponent mixture in geological exploration. However, the intervals between these two temperature parameters are preferably more pronounced Thus, in preferred embodiments, the intervals between the two temperature parameters in question is preferably at least 10° C. to 15° C. and, more preferably, at least 20° C. to 30° C. This does not give rise to any particular difficulties in practice because temperatures of 100° C. and higher are of course reached comparatively quickly in the hot rock.

Accordingly, it is generally preferred to put the upper limit for the definition and determination of the PIT or PIT range in the context of the teaching according to the invention at a maximum of 100° C. or only slightly higher, for example at a maximum of 110 to 120° C. In preferred embodiments, the upper limit for the choice and adjustment of the PIT is at temperatures below 100° C., for example at a maximum of about 80 to 90° C., preferably at a maximum of 60° C. and more preferably at a maximum of 50° C. It follows from this that multicomponent mixtures of the described type which have a PIT in the range from about 5 to 80° C., preferably in the range from about 10 to 60° C. and more preferably in the range from 15 to 50° C. can be of particular advantage for the teaching according to the invention. In one particularly preferred embodiment of the invention, the PIT may be in the range from 20 to 35° C. or even up to 40° C. This is illustrated by the following considerations:

In the practical application of multicomponent mixtures according to the invention, for example as a flowable and pumpable drilling fluid in geological exploration, the drilling fluid is continuously circulated downwards into the rock and then—charged with the rock cuttings—back up again to the drilling platform. The rock cuttings are removed, normally by sieving, on the drilling platform and the flowable and pumpable liquid phase recovered is pumped into a storage tank from which the invert mud is repumped downwards into the well. In the course of its circulation, the drilling fluid passes through a considerable temperature gradient, even if the fluid and rock cuttings are pumped upwards while still hot. The technical stages involved in the sieving and storage of the drilling fluid in the storage tank generally lead to a reduction in the temperature of the fluid, for example to a value of about 40 20 to 60° C.

By adapting the phase inversion or rather the PIT to these parameters, the teaching according to the invention provides for a preferred embodiment in which the circulated drilling fluid does not undergo phase inversion, even in the comparatively cooler regions outside the well. If the PIT (or PIT range) of the system is set and maintained at a predetermined limit, for example of 50° C., this objective can be achieved with simple means. Even at cold times of the year, corresponding lower limits for the temperature of the pump-circulated invert mud phase can be maintained in the circuit, for example by corresponding heating elements in the storage tank However, the advantages of the teaching according to the invention now come into play for the working up and disposal of the cuttings separated from the fluid: by further reduction, the temperature reaches and, if desired, passes the lower limit of the PIT range, so that first the microemulsion middle phase and then, as the temperature is further reduced, the water-based o/w emulsion phase are established in those parts of the drilling fluid adhering to the cuttings. It can immediately be seen that disposal of the residual oil adhering to the cuttings can thus be substantially simplified.

For example, in the field of drilling muds for land-supported and/or preferably offshore exploration, it can be advisable to use drilling muds with a PIT of or below 50° C., for example with a PIT in the range from 20 to 35° C. The drilling fluid can thus be circulated without phase reversal and, hence, continuously as a w/o invert mud. However, the cuttings separated off can now be cleaned more easily, above all in situ, or may even be disposed of by direct dumping. The optimum embodiment for this disposal step can be determined on the basis of general expert knowledge. The following particular observations are made in this regard:

If the cuttings covered with drilling fluids formulated in accordance with the invention are dumped directly into the surrounding seawater in offshore drilling, the temperature-controlled inversion phase (middle emulsion phase) and then the o/w emulsion phase are rapidly established in these fluid residues by cooling in the seawater. The diluting effect of the surrounding seawater can develop its full effect so that the oil droplets formed no longer adhere to the rock and are thus free to move. At least some of the oil droplets float upwards in the seawater where they encounter comparatively high concentrations of oxygen in the aqueous phase and undergo aerobic degradation comparatively easily.

However, the cuttings to be disposed of can also be at least partly freed from the oil phase in a separate working step preferably carried out in situ: at the temperature adjusted for the middle inversion phase, the oil phase is particularly easy to wash out, as required in the prior art for enhanced oil recovery, so that a corresponding washing process, for example, can be carried out without undue effort using water-based washing liquids, for example quite simply seawater. If the temperature is further reduced, an o/w emulsion is formed. The drilling fluid can thus readily be separated up into the aqueous phase and the oil phase in a potential step of such a cleaning process. In particular, however, separation between flowable and pumpable parts—the residues of the drilling fluid adhering to the drill cuttings—and the cuttings to be disposed of is considerably facilitated. Different separation principles may be used separately from or in combination with one another. Relevant particulars are explained in the following.

Taking this consideration into account, it will readily be appreciated that preferred drilling muds for land-supported and/or preferably for offshore geological exploration, more particularly for the development of oil and/or gas occurrences, can be formulated in such a way that they have ai PIT of or below 50° C., preferably of or below 40° C. and, more particularly, in the range from 20 to 35° C. The PIT of the system as a whole may be adapted in particular to the conditions under which the drilling mud is used so that the cuttings covered with drilling mud can be cleaned after removal from most of the drilling mud by washing with cold water, more particularly with seawater, and preferably with inversion from the w/o to the otw phase.

Before details of such a water-based process for washing the mud-covered cuttings are discussed, the following important aspect of the teaching according to the invention will be considered: the conversion of the w/o invert emulsions present in practice by temperature reduction into the PIT range and, in particular, to temperatures below the PIT range can lead to substantial simplification or intensification of the separation between the cuttings present as solids on the one hand and the emulsion residues adhering thereto with or without addition of liquid detergents. Thus, pure gravity separation of the liquid phase from the solid phase can be significantly enhanced by treatment of the multiphase material in high-speed separators—for example corresponding decanters and/or centrifuges—in the o/w emulsion state now present here. In addition, use can be made of the fact that the flow behavior of the emulsion in the o/w state can be considerably improved in relation to the same multicomponent mixture—but now in the w/o invert state—or the corresponding viscosity in the o/w state can be reduced. The teaching of the invention can make use of this in important embodiments. By suitable adjustment of these physical parameters in the multicomponent emulsion, it is possible on the one hand to satisfy requirements in practice in the w/o invert emulsion state; on the other hand, distinct enhancement of gravity separation and hence intensified removal of the emulsion residues now present in the o/w state from the cuttings to be cleaned can be achieved in accordance with the invention by phase inversion to the following cleaning step. Accordingly, where ecologically safe oil phases are used during the drilling process in the w/o invert drilling mud, the quantity of oil on the cuttings to be disposed of can be reduced to such an extent that, even in offshore exploration, the cuttings can be disposed of simply by dumping, even where the ecological compatibility of the drilling process as a whole has to meet stringent requirements.

Extensive expert knowledge is available for carrying out this separation of fluid material from the solid surfaces of the cuttings in practice by enhanced gravity separation. In particular, high-speed separators of the decanter, centrifuge and/or cyclone type may be used here. It is known that the g force can be increased to 10,000–12,000 through the choice and control of the rotational speed. At the same time, the throughput of quantities of material to be separated accumulating in large-scale processes is guaranteed. Suitable separators are, for example, tube cetrifuges, solid-wall centrifuges and screen centrifuges or separators of the disk centrifuge type. Relevant expert knowledge may be applied in this regard. The same applies to comparable separators of the decanter or cyclone type. The use of decanters of the type known among experts as helical-conveyor centrifuges can be of particular significance in this regard. The work on which the teaching according to the invention is based has shown that such pure separation using enhanced gravity—for example in the g force range from 1,000 to 15,000 and particularly in the g force range from 5,000 to 12,000—enables the residual oil to be removed from the drill cuttings to such an extent that the cuttings can be disposed of by dumping even despite stringent ecological requirements. This is particularly favorable for cases where ecologically safe oil phases are used in the invert drilling muds, particular significance being attributed to auxiliaries based on ester oils.

The possibility mentioned here of applying the procedure according to the invention, even without using additional detergents, is significantly broadened by selectively employing such washing aids. Optimum washing results can be obtained using very significantly limited quantities of washing liquid. Adhering residues of the emulsion drilling mud can be almost completely removed from the cuttings.

Extensive relevant expert knowledge is available for carrying out the washing process in practice. The following additional considerations, for example, apply to the choice of optimized special process conditions. It may be desirable to limit the total quantity of aqueous washing liquid phase to be used as far as possible and still to achieve optimum cleaning, i.e. removal of the adhering oil phase. The washing process can be carried out in one or more stages In general, the washing stages are preferably of limited duration, lasting for example a matter of minutes and preferably at most about one minute or even far less. The particular characteristics of the material to be washed off have to be taken into account in this regard. It is clear that, where water-swellable clays are present in the cuttings to be cleaned, their readiness to swell by taking up water should be taken into consideration whereas similar concerns recede into the background in the case Of cuttings based on non-swellable minerals.

In important embodiments, the teaching according to the invention combines a number of operating parameters for promoting and facilitating the separation process between the solid phase on the one hand and the emulsion phase based on the drilling mud residues to be removed on the other hand. Combinations of washing stages and enhanced gravity separation are particularly appropriate in this regard. For example, the above-described separation by simple centrifugation of the soiled cuttings in the centrifuge at temperatures in the o/w emulsion range can be enhanced by additionally applying washing liquid to the material to be cleaned, more particularly by spraying. Water-based washing aids and, in one particular embodiment, quite simply cold water is preferably used as the cleaning aid. This washing aid may be applied to the solid material involved in the centrifugation process either all at once or even in a number of successive stages.

However, the improved washing of cuttings with water-based washing aids is also possible without centrifugation. General expert knowledge enables the cold washing process to be optimized. In this case, too, the washing process can basically be accelerated by application of mechanical energy It will generally be preferred to apply the energy to the water-based detergent phase and to wash the material to be cleaned by spray-washing in one or more stages using elevated pressures. In a particularly advantageous embodiment, use can be made of the relevant technology to remove the drill cuttings from the drilling mud by sieving, particularly on vibrating sieves, before the washing process according to the invention. Accordingly, the subsequent washing step may be carried out, for example, directly on the solid material remaining behind on the sieve in a comparatively thin layer. In this embodiment, the washing step may be carried out, for example, by pressure washing where the washing liquid is applied through solid-cone nozzle heads, more particularly in the form of corresponding pressure nozzles and, if desired, even in the form of multicomponent nozzles. Washing with multicomponent nozzles of the type used in pneumatic spraying is particularly effective. In this case, the set of nozzles can be adjusted in known manner by changing the air and liquid pressure to produce particularly fine or coarse droplets. A large air to liquid ratio is thus possible. At the same time, the introduction of energy into the droplet-like washing liquid can be optimally intensified which in turn optimizes the washing result. In this way, not only can the total amount of washing liquid to be used be considerably reduced, the duration of the washing process can also be significantly shortened so that effective washing can be carried out in a matter of seconds, for example in up to 20 or up to 40 seconds or less. In this case, too, the washing process may be carried out in a sequence of several washing stages, the duration of each washing stage being, for example, from 1 to 10 or even from 1 to 5 seconds.

In order further to intensify and shorten the washing process, vibrating sieves may again be used where the cuttings are washed on a sieve so that new parts of the soiled cutting surfaces are continually exposed to the sprayed water-based washing liquid in the successive washing stages.

The high-pressure washing process may be carried out, for example, with pressures of the sprayed washing liquid of 2 to 200 bar and preferably i10 to 100 bar. The distance between the nozzles and the solid surfaces to be cleaned is for example, at most 10 to 50 cm. Effective cleaning results are obtained with limited amounts of washing liquid which make up only a fraction of the cutting volume.

The washing water containing the emulsion removed from the cuttings can be separated up into a water phase/oil phase and, optionally, a fine-particle solid phase, if desired after temporary storage involving partial phase separation—for example in a three-phase separator. Once again, extensive expert knowledge of the separation of corresponding water/oil emulsions or dispersions is available for this phase separation step. The separation process may be carried out purely mechanically, more particularly by gravity separation in high-speed centrifuges. Depending on the stability of to o/w mixtures present, corresponding separators generating relatively low g forces may also be used. Both separators and centrifuges can be continuously integrated into the separation process in known manner.

Other known possibilities for separating the oil- and water-containing washing liquids are such well-known processes as flotation and, in particular, even membrane separation. If necessary, an overly intensive emulsion state in the washing liquid can be broken beforehand by addition of demulsifiers.

Basically, it is possible in this stage of the process according to the invention to achieve adequate separation of the water and oil phases. This in turn enables the phases thus separated from one another to be at least partly reused. For example, the water phase may be reused for the production of fresh drilling mud.

The high flexibility of the teaching according to the invention in regard to the composition of the oil phase to be used in specific cases will readily be appreciated above all from these considerations. Even stringent requirements as to the ecological compatibility of the process in regard to the cuttings to be disposed of can be satisfied in w/o invert systems by oil phases which, hitherto, could no longer be used on account of their ecological incompatibility and, above all, their inadequate degradability by natural degradation processes under anaerobic conditions. Totally new possibilities are thus opened up for the optimization of the three main parameters (technical perfecting and complete ecological compatibility for a reasonable cost effectiveness ratio) which the invention seeks to achieve: by virtue of the above-described possibilities for the automatic cleaning and freeing of the cuttings from adhering oil, a relatively large supply of oil phase to be degraded is no longer built up by dumping on the seabed in offshore disposal. Natural aerobic degradation processes in the oxygen-rich zone of the sea surface are activated. At least most of the oil can be removed from the cuttings before they are dumped by simple preliminary washing with a liquid based on cold water.

It can thus be seen that the entire hitherto known broad range of potential oil phases opens up for the teaching according to the invention. Thus, oil phases or mixed oil phases belonging at least partly and preferably at least predominantly to the following classes of oils are suitable for the teaching according to the invention:

Saturated hydrocarbons (linear, branched and/or cyclic), olefinically unsaturated hydrocarbons, more particularly of the LAO type (linear α-olefins), the IO type (internal olefins)

and/or the PAO type (polymeric α-olefins), aromatic hydrocarbons, naphthenes, carboxylic acid esters, ethers, acetals, carbonic acid esters, fatty alcohols, silicone oils, (oligo)amides, (oligo)imides and/or (oligo)ketones.

The carboxylic acid esters previously mentioned in this regard include, on the one hand, corresponding esters of monocarboxylic acids and/or polycarboxylic acids and, on the other hand, corresponding esters of monohydric alcohols and/or polyhydric alcohols. Reference is again specifically made in this connection to the above-cited publications on the use of corresponding ester phases in the field in question which go back to work done by applicants. Over and above the disclosures of these literature references, however, the following discoveries have been made for the (variant according to the invention:

In embodiments according to the invention of the multi-component mixtures in question here and, in particular, correspondingly formulated drilling fluids, esters of poly-hydric alcohols with monocarboxylic acids and, in particular, glycerol esters of natural and/or synthetic origin may be effectively used for the first time as the oil phase or as part of the oil phase. In relevant prior art publications, it has been alleged for many years that oils of natural origin and, hence, corresponding glycerol-based triesters of higher unsaturated fatty acids can be used as an ecologically safe oil phase in w/o invert muds. In applicants' above-cited publications on the subject of ester-based drilling fluids, it is shown that these assertions in the prior art literature are purely theoretical and do not apply in practice. Surprisingly, it has been found using the systems according to the invention defined in detail hereinafter that triglycerides of natural and/or synthetic origin may be used as or in the oil phase of the drilling fluids. For example, it is possible to use triglycerides of vegetable and/or animal origin (for example of the rapeseed oil or fish oil type) which can be of considerable interest both ecologically and in regard to the cost:effectiveness ratio. The modifications to the composition of the drilling fluids involved in the technical realization of the concept according to the invention (possible choice of the preferred emulsifiers according to type and quantity) evidently create such modified basic conditions that the long-desired technical use of such oil phases, particularly of natural origin, is really made possible for the first time.

In terms of their chemical structure, therefore, any oil phases which enable the physical parameters required for the present technology to be established are basically suitable. These parameters will be discussed hereinafter The aspects of optimized ecological compatibility naturally remains an important aspect so far as the choice of the oil phase is concerned although it is no longer as important as before—even taken legislation into account. The use of temperature-controlled phase inversion provides for the ecologically safe disposal of that part of the drilling fluid which, hitherto, has presented the most difficulties in the handling of w/o-inert-based drilling fluids.

Over and above this elimination of existing difficulties, however, the teaching according to the invention also enables environmental protection to be achieved to a hitherto unknown level. By selecting environmentally particularly safe oil phases for the invert drilling fluid and by virtue of the possibility afforded by the invention of minimizing the problems of the degradation process, a hitherto unknown overall working result can be achieved in the direction of the objective of the invention. It is particularly important in this connection to take into account the known possibility now used with particular advantage in accordance with the invention of employing selected mixtures of different oils as the oil phase of the drilling fluid. Thus, it is possible to use mixtures of, on the one hand, anaerobically and/or aerobically non-readily degradable oils and, on the other hand, anaerobically and/or aerobically readily degradable oils which, in the form of cutting disposal optimized in accordance with the invention, represent an important step towards achieving the goal of total optimization according to the invention.

In this connection, another possibility for modifying the technology of w/o invert systems in question here will first be discussed. Here, too, there are significant advances to be achieved over the relevant prior art:

At present, conventional w/o invert systems and, more particularly, corresponding invert drilling fluids contain the oil phase in a quantity of at least 50% by volume, based on the ratio by volume of oil phase to water phase. The oil phase content is normally significantly higher, for example of the order of 70 to 90% by volume of the oil/water mixture. Although the relevant literature also mentions low-oil invert fluids, these comparatively low-oil mixtures play no part in practice, particularly in systems with the adequate ecological compatibility now demanded.

It was pointed out at the beginning that the phase inversion temperature range is determined inter alia by the quantity ratio of oil phase to emulsifier/emulsifier system, more particularly nonionic emulsifier/emulsifier system. Now, the larger the quantity of emulsifier/emulsifier system (based on the quantity of oil phase) used, the further generally the temperature range for adjusting the PIT will be lowered. At the same time, however, the stability of the w/o invert emulsion in practice will be increased so drastically that the range of useful quantity ratios in the particular oil/water mixture is significantly broadened. Quantity ratios (parts by volume) of water-based phase (W) to oil phase (oil) in the following ranges will thus become accessible for building up the multiphase and, preferably, pumpable mixtures: 90 to 10 W: 10 to 90 oil. Mixing ratios of 55 to 20 W: 15 to 80 oil can be particularly preferred. Taking into account the emulsifiers/emulsifier systems defined in the following, it will readily be possible to use w/o oil mixtures which contain the W phase in quantities of at least 30 to 40 parts by volume or even at least 50 parts by volume, for example in quantities of 55 to 85 parts by volume. The oil phase can thus even become quantitatively the minor component which, for example in a quantity of at least 10 to 15 parts by volume and preferably 20 to 50 parts by volume (based on the sum of the W and oil) guarantees stable w/o invert conditions at the temperatures prevailing in the rock. In this case, preferred multicomponent mixtures according to the invention are those of which the waterbased phase makes up from 30 to 35% or more, preferably 40% or more and, more preferably, 50% or more (% by volume, based on the W/oil mixture). Mixtures with a predominant water phase can be of particular significance, quantities of up to 85% by volume and, more particularly, 55 or 60 to 80% by volume of the water-based phase being particularly preferred. Accordingly, the invention also encompasses w/o invert drilling fluids with a greatly reduced oil phase content which should make up no more than 20 to 40% by volume, based on the liquid phases, but at the same time satisfies the stated requirements in practice. The fact that disposal is again made considerably easier will be immediately apparent.

Extensive textbook knowledge and other relevant material is available on the chemical characteristics of emulsifiers, particularly nonionic emulsifiers, which are capable of temperature-controlled phase inversion and the characteristics of emulsifier systems containing corresponding nonionic components. Even the above-cited article by SHINODA et al. in Encyclopedia of Emulsion Technology, 1983, Vol. 1. 337 to 367 lists more than 100 special representatives of emulsifiers of which most may be classed as nonionic emulsifiers. In the relevant Table (Table 4 loc. cit.), the particular chemical component is accompanied by its HLB number. The Table encompasses in particular the number range from 1 to 20. The relevant prior art literature is also represented by the Article by Gordon L. Hollis in Surfacants Europa, Third Edition, The Royal Society of Chemistry, more particularly Chapter 4, Nonionics (pages 139 to 317). In addition, the unusually extensive relevant literature is also represented, for example, by the following publications which have appeared in book form: M. J. Schick "NONIONIC SURFACTANTS", Marcel Dekker, INC., New York, 1967; H. W. Stache "ANIONIC SURFACTANTS", Marcel Dekker, INC., New York, Basel, Hongkong; Dr. N. Schonfeldt "Grenzflächenaktive Ethyleneoxid-Addukte", Wissenschaftliche Verlagsgesellschaft mbH,-Stuttgart 1976.

From this extensive knowledge of at least partly nonionic emulsifiers or emulsifier systems, it is possible on the basis of the expert knowledge likewise cited at the beginning (SHINODA et al. and Th. Forster et al.) to calculate the phase inversion temperature range for given mixtures of oil phase, emulsifier or emulsifier mixtures and aqueous phase. Accordingly, a few additional determining elements preferably applied in accordance with the invention to the choice of the emulsifier or emulsifier systems are discussed in the following It has proved to be helpful to use multicomponent emulsifier systems for controlling and adapting the required phase inversion temperature (PIT) range to the particular mixture of the multicomponent system, more particularly taking into account the choice of the oil phase in regard to type and quantity and the level of soluble components in the aqueous phase. Mixtures containing at least one principal emulsifier component together with co-emulsifiers can be advantageous. Another preferred emodiment contains principal emulsifier components which, in addition to being suitable for temperature-controlled phase inversion, have relatively high HLB values. Components with corresponding HLB values in the range from about 6 to 20 and preferably in the range from 7 to 18 have proved to be suitable principal nonionic emulsifier components. These principal components are preferably used together with relatively highly lipophilic emulsifiers which in turn have relatively low HLB values compared with the particular principal emulsifier component(s). Accordingly, useful co-emulsifiers fall first and foremost in the HLB range below the range mentioned above for the principal emulsifier component(s). Suitable coemulsifiers may also fall within this HLB range, although they generally have lower values than the principal emulsifier component(s) present in admixture with their individual HLB values.

The following variant has proved to be particularly interesting for putting the teaching according to the invention into practice. In one important embodiment of the teaching according to the invention, the w/o emulsifiers used in practice today, particularly in oil-based invert drilling fluids, are capable of performing the function of the relatively highly lipophilic co-emulsifier in the emulsifier mixtures according to the present invention. Examples of such w/o emulsifiers of oil-based invert muds which can be found in large-scale use today are compounds from the class of anionically modified oligoaminoamides of long-chain fatty acids. The calcium salts of these components which are formed in the presence of lime have a pronounced emulsifying effect. In admixture with principal emulsifier components in the sense of the teaching according to the invention, they become effective co-emulsifiers for systems of the type with which the invention is concerned. The fact that this variant of the teaching according to the invention may be of particular interest can immediately be seen. Existing expert knowledge on the composition of oil-based w/o invert emulsions or corresponding drilling muds may largely be retained. The teaching according to the invention is implemented simply by adding one or more other emulsifier components of the type defined above which are capable of temperature-controlled phase inversion in the w/o invert system. The modification of tried and tested multicomponent systems of the type in question to meet the requirements of the teaching according to the invention can thus be considerably simplified.

The following factors can assume particular significance for implementing the teaching according to the invention:

Suitable oil phases include compounds which, at the same time, have a pronounced co-emulsifier effect in the combination of emulsifier system and oil phase. A classic example of such compounds are lipophilic fatty alcohols of natural and/or synthetic origin. Given adequate flow properties under in-use conditions, they can be a valuable part of the oil phase or can even form the oil phase as a whole. At the same time, they influence the relatively highly hydrophilic principal emulsifier components added by providing the required reduction in the PIT range. Alcohols of this type are known to be ecologically safe components. They are both aerobically and anaerobically degradable. Mixtures thereof with other oil components, more particularly oil components which do not have the same ready degradability, provide valuable results in promoting the overall optimization sought by the invention. However, other oil phases known from the literature, which are predominantly lipophilic with built-in groups of high polarity, are also capable of developing a corresponding co-emulsifier effect. The (oligo) amides, (oligo)imides and (oligo)ketones are mentioned as examples of such oil phases.

From the broad range of nonionic emulsifiers, particularly suitable principal emulsifier components and/or co-emulsifiers may be assigned in accordance with the invention to at least one of the following classes:

(Oligo)alkoxylates—more particularly low alkoxylates among which corresponding ethoxylates and/or propoxylates are particularly important—of basic molecules of natural and/or synthetic origin which contain lipophilic residues and which are capable of alkoxylation. The length of the alkoxylate groups in relation to the lipophilic groups present in the molecule determine the particular mixing ratio of hydrophilic to hydrophobic behavior in known manner and the associated assignment of the HLB values. Alkoxylates of the type mentioned are known to be nonionic emulsifiers as such, i.e. with a free terminal hydroxyl group at the alkoxylate residue, although the corresponding compounds may also be end-capped, for example by esterification and/or etherification.

Another important class of nonionic emulsifiers for the purposes of the invention are partial esters and/or partial ethers of polyhydric alcohols containing in particular 2 to 6 carbon atoms and 2 to 6 OH groups and/or oligomers thereof with acids and/or alcohols containing lipophilic residues. Particularly suitable compounds of this type are those which additionally contain (oligo)alkoxy groups and, in particular, corresponding oligoethoxy groups incorporated in their molecular structure. The polyfunctional alcohols containing 2 to 6 OH groups in the basic molecule and the oligomers derived therefrom may be, in particular, diols and/or triols or oligomerization products thereof, particular significance being attributed to glycol and glycerol or oligomers thereof. However, other polyhydric alcohols of the type collectively mentioned here, such as trimethylol propane, pentaerythritol and so on up to glycosides or their respective oligomers may also be basic molecules for the reaction with acids and/or alcohols containing lipophilic groups which are thus important emulsifier components in the context of the invention. Partial ethers of polyhydric alcohols also include known nonionic emulsifiers of the ethylene oxide/propylene oxide/butylene oxide block polymer type.

Further examples of corresponding emulsifier components are alkyl (poly)glycosides of long-chain alcohols, the fatty alcohols of natural and/or synthetic origin already mentioned and alkylol amides, amine oxides and lecithins The presence of commercial alkyl (poly)glycoside compounds (APG compounds) are emulsifier components in the context of the invention can be of particular interest inter alia because emulsifiers belonging to this class show pronounced ecological compatibility. Other principal emulsifier components, for example nonionic surfactant compounds with fairly pronounced phase inversion behavior, may also be partly used, for example for controlling phase inversion into the temperature ranges defined in accordance with the invention. These other principal emulsifier components may be selected, for example, from the oligoalkoxylate compounds which have already been repeatedly mentioned, more particularly from corresponding compounds of the oligoethoxylate type. However, this variation of the improved controllability of phase inversion behavior can also be obtained by corresponding oligoalkoxyation of the APG components themselves. However, by suitably selecting the type and quantity of APG components as principal emulsifier and co-emulsifiers, for example conventional w/o invert emulsifiers, the requirements according to the invention can again be satisfied without any other emulsifying auxiliaries.

Without any claim to completeness, the following representatives from the classes of suitable emulsifier components listed herein are additionally named: the (oligo) alkoxylates of basic molecules containing lipophilic groups may be derived in particular from selected representatives from the following classes of basic molecules containing lipophilic groups: fatty alcohols, fatty adds, fatty amines, fatty amides, fatty acid and/or fatty alcohol esters and/or ethers, alkanolamides, alkylphenols and/or reaction products thereof with formaldehyde and other reaction products of carrier molecules containing lipophilic groups with lower alkoxides. As already mentioned, the particular reaction products may also be at least partly end-capped. Examples of partial esters and/or partial ethers of polyhydric alcohols are, in particular, the corresponding partial esters with fatty acids, for example of the glycerol monoester and/or diester type, glycol monoesters, corresponding partial esters of oligomerized polyhydric alcohols, sorbitan partial esters and the like and corresponding compounds containing ether groups. The extensive expert knowledge available may be applied in this regard. The partial esters and/or ethers in question may also be basic molecules for an (oligo) alkoxylation reaction.

As mentioned above, a key determining element for the teaching according to the invention is that the quantity of emulsifier/emulsifier systems used in the multicomponent mixture is adapted to the percentage content of oil phase therein. Accordingly, preferred quantities of emulsifier are of te order of 1% by weight or larger and preferably in the range from 5 to 60% by weight, based on the oil phase. In practical terms, the following quantity ranges have proved to be particularly suitable for the emulsifiers/emulsifier systems used in accordance with the invention (based on the oil phase): 10 to 50% by weight, preferably 15 to 40% by weight and more preferably 20 to 35% by weight. Accordingly, the quantities of emulsifier are comparatively large by comparison with conventional w/o invert emulsion systems of the type used in the field targeted by the present invention. However, this is not necessarily a disadvantage. On the one hand, the necessary quantity of oil in the water/oil mixture can be greatly reduced in this way in relation to present levels without having to accept any disadvantages. On the other hand, the situation discussed in the foregoing has to be taken into consideration, i.e. selected oil phases, for example fatty alcohols, can perform a dual function and, accordingly, are both the oil phase and at the same time a co-emulsifier in the system formulated in accordance with the invention. It can be seen that totally new principles for system and process optimization in the sense of the problem addressed by the present invention can be derived from this aspect, too.

In addition to the foregoing observations, the following additional comments apply to the choice of the oil phases. The initially emulsifier-free oil phase should be at least predominantly insoluble in the aqueous emulsion phase and should preferably be flowable and pumpable even at room temperature. Flash points of the oil phases above 50 to 60° C., preferably in the range from 80 to 100° C. or higher and more preferably of the order of 120° C. or higher are desirable and preferred. It can also be of advantage to use oil phases which have a Brookfield (RVr) viscosity at 0 to 10° C. of not more than 55 mPas and preferably not more than 45 mPas, cr. the cited relevant literature on modem w/o invert emulsions and, in particular, the disclosures of applicants' above-ited European patents and patent applications which are hereby specifically included as part of the disclosure of the present invention.

The same also applies to the mixtures of aqueous phase, oil phase, emulsifiers and typical additives formulated as a drilling mud. In one particular embodiment, the mixture formulated as a drilling mud has a plastic viscosity (PV) of not more than 100 mPas at a temperature 10 to 15° C. above the limit between the middle emulsion phase and the w/o invert range. Preferred drilling muds are corresponding drilling muds which have a PV of not more than 80 mPas and, more particularly, in the range from 30 to 45 mPas. The yield point (YP) of drilling muds formulated in accordance with the invention should be no greater than 80 lb/100 ft$^2$ at a temperature 10 to 15° C. above the limit between the middle emulsion phase and the w/o invert range. The preferred yield point is no greater than 50 lb/ft$^2$ and, more particularly, is above 4 to 5 lb/ft$^2$, for example in the range from 10 to 25 lb/ft$^2$.

The appropriate overall composition of the free-flowing auxiliary used to implement the teaching according to the invention is also determined by modem practical requirements. In this regard, too, reference may be made to the extensive prior art literature cited in the description of the invention, particularly in regard to the w/o invert fluids. Accordingly, corresponding mixtures according to the invention, for example as drilling muds, additionally contain auxiliaries typically used in this field, such as thickeners, fluid loss additives, fine-particle weighting materials, salts, optionally alkali reserves and/or biocides. Further particulars, which are also applicable to the formulation of drilling fluids in accordance with the invention, can be found for example in EP 374 672. The use of water-soluble methyl glycoside compounds in the aqueous phase also falls within the scope of the invention, cf. for example PCT WO 94114919.

A particular feature will now be discussed in this regard. Although based on expert knowledge of the specialist field in question, this feature has not generally been instrumental in the composition of known w/o invert drilling fluids:

It is known that water-based emulsion muds and, in particular, drilling fluids of the o/w type can be stabilized against the unwanted sedimentation of dispersed solids, even at comparatively low temperatures, by the presence of water-soluble polymer compounds. In principle, water-soluble polymer compounds of both natural and synthetic origin are suitable for this purpose. Relevant expert knowledge may be applied in this regard.

According to the invention, the drilling fluid as a whole may also be cooled outside the point of use to such an extent that it undergoes phase inversion to an o/w emulsion. The relevant rules thus apply in regard to adequate stabilization of the system so that, in particular, the use of the stabilizing water-soluble polymer compounds in question and/or even water-swellable clays may be considered. Their presence in the w/o invert phase in the hot working zone is not a problem.

Detailed information on the composition of drilling fluids of the type targeted by the invention and, more particularly, water-based or oil-based drilling fluids and the auxiliaries used in practice in this connection can be found, for example, in the abovecited book by George R. Gray and H. C. H Darley entitled "Composition and Properties of Oil Well Drilling Fluids", 4th Edition, 1980/81, Gulf Publishing Company, Houston, cf. in particular Chapter 1 "Introduction to Drilling Fluids" and Chapter 11 "Drilling Fluids Components".

Despite the presence of all auxiliaries known per se, the characteristic of all auxiliary liquids and, in particular, drilling fluids in the context of the teaching according to invention remains: through the correct choice and coordination of the emulsifiers/emulsifier systems as to type and quantity, more particularly with the characteristics of the oil phase used, the w/o invert phase is formed above the middle emulsion phase on contact with the interior of the rock and the high working temperatures prevailing there, at least at the contact surface between hot rock and emulsion. Outside the working zone within the rock, the temperature is reduced, the behavior of those parts of the drilling fluid present there either as a whole or individually again being controllable in various ways through the choice and coordination of the parameters mentioned above. Finally, the objective pursued by the invention, as formulated at the beginning, can be achieved in a hitherto unknown manner.

The following Examples are intended to illustrate specific embodiments of the teaching according to the invention without limiting it in any way.

EXAMPLES

Examples 1 to 7 below contain general formulations which are characterized by the basic system of oil phase and water or aqueous phase and emulsifier or emulsifier system. Whereas the formulation of Example 1 is confined to these basic components, standard additives for drilling muds are used in Examples 2 to 7.

In the Tables summarizing these Examples, the values determined for the phase inversion temperature range (PIT/° C.) are assigned to the particular system. The PIT range is characterized by its lower and upper temperature limits.

The phase inversion temperature is experimentally determined by measurement of the electrical conductivity of the aqueous emulsions as a function of temperature. Particulars of the test procedure can be found in the general descriptions of EP 0 345 586 and EP 0 521 981.

In the formulations of these Examples, some of the components used are identified by their commercial names:

| Oil Phases: | |
| --- | --- |
| Cetiol OE | ether oil based on di-n-octyl ether |
| OMC 586 | oil phase based on an ester mixture of substantially saturated fatty acids based on palm oil and 2-ethyl hexanol which, for by far the most part, goes back to $C_{12/14}$ fatty acids |
| Mineralöl Ha-359 | low-aromatic mineral oil fraction for invert drilling fluids |
| Emulsifiers: | |
| Dehydol LT 5 | $C_{12-18}$ fatty alcohol.5 EO |
| CETIOL HE | polyol fatty acid ester based on polyoxyethylene glyceryl monococoate |
| DEHYMULS SML | sorbitan monolaurate |
| Eumulgin EP4 | oleyl alcohol.4 EO |
| Lutensol T05 and T07 | isotridecyl alcohol.5 EO and .7 EO |
| Dehydol 980 | $C_{10-14}$ fatty alcohol.1.6 PO.6.4 EO |
| RS 1100 | soya polyol 85.61 EO |
| Ez-Mul NTE | w/o invert emulsifier, a product of BAROID, Aberdeen |
| Auxiliaries | |
| Geltone II | organophilic bentonite |
| Duratone | organophilic lignite |
| Tylose VHR and CMC E HVT | cold-water-soluble polymer compounds based on carboxymethyl cellulose |
| Natrosol Plus | cold-water-soluble polymer compound based on hydroxyethyl cellulose (HEC) |

The additives additionally listed in the Tables are self-evident from their chemical identification.

Example 1

Mixtures of the ether-based oil phase and water or a 5% by weight aqueous solution of $CaCl_2$ are homogenized in equal quantities in the usual way using a nonionic emulsifier. The electrical conductivity of the emulsions is then measured as a function of temperature and the phase inversion temperature range is thus determined. The following numerical data apply in this regard:

| | (a) | (b) |
| --- | --- | --- |
| Cetiol OE | 45.0 | 45.0 |
| Dehydol LT 5 | 10.0 | 10.0 |
| Water, dist. | 45.0 | |
| Aqueous $CaCl_2$ solution (5%) | | 45.0 |
| PIT/° C. | 69–81 | 59–68 |

Example 2

The dependence of the PIT range of basically comparable, but modified systems is determined in three comparison tests.

In all three tests, the ether oil phase and the emulsifier correspond to the compounds of Example 1. Now, however, auxiliaries typically used in weighted drilling muds are mixed in as additives together with the oil phase and emulsifier. The differences between the three tests of this Example are as follows:

Example 2a

Equal quantities by weight of oil phase and aqueous phase (5% $CaCl_2$)

Example 2b

The percentage of oil phase is greatly reduced in relation to the aqueous phase (12 parts by weight to 41 parts by weight of aqueous phase). The formulation does not contain a cold-water-soluble thickener.

Example 2c

The basic formulation of Example 2b is retained, but with the following modifications: the salt content of the aqueous phase is increased from 5% by weight $CaCl_2$ to 30% by weight $CaCl_2$. In addition, a cold-water-soluble polymer compound is used to thicken the aqueous phase, even at low temperatures.

The phase inversion temperature range (PIT/° C.) of all the mixtures is determined. In addition, the viscosity of the mixtures is determined first at a temperature well below the PIT range (viscosity at 25° C.) and second at a temperature well above the PIT range (viscosity at 70° C).

|  | (a) | (b) | (c) |
|---|---|---|---|
| Cetiol OE | 25.07 | 12.0 | 12.0 |
| Dehydol LT 5 | 5.57 | 2.67 | 2.67 |
| Bentonite | 0.20 | 0.20 | 0.20 |
| Geltone II | 0.40 | 0.40 | 0.40 |
| Duratone | 0.60 | 0.60 | 0.60 |
| Tylose VHR | 0.10 | 0.10 |  |
| Natrosol Plus GR 331 CS |  |  | 0.20 |
| Barite | 43.0 | 43.0 | 43.0 |
| Aqueous $CaCl_2$ (5%) | 25.07 | 41.03 |  |
| Aqueous $CaCl_2$ (30%) |  |  | 40.93 |
| PIT/° C. | 55–65 | 54–61 | 47–49 |
| Viscos. (100/s)/mPas at 25° C. | 120 | 7 | 380 |
| Viscos. (100/s)/mPas at 70° C. | 40 | 140 | 60 |
| Stability | Sediments slowly | Sediments quickly | Sediments slowly |

The distinct reduction in the PIT range by increasing the salt concentration of the aqueous phase (Example 2c against Example 2b) is evident in this case, too. The lower viscosity of the multicomponent mixture in the water-based o/w emulsion phase at temperatures below the PIT (Example 2b) is arrested by using the small quantity of HEC-based polymeric thickener.

Example 3

Examples 3a and 3b modify the oil phase of the particular multicomponent mixture. The ester oil OMC 586 is now used. In accordance with the basic formulations of Example 2, the oil phase and the water phase are used in equal quantities (Example 3a) and the o/w ratio is again drastically reduced (Example 3b). The phase inversion temperature range is determined for both mixtures.

|  | (a) | (b) |
|---|---|---|
| OMC 586 | 25.07 | 12.0 |
| Dehydol LT 5 | 5.57 | 2.67 |
| Bentonite | 0.20 | 0.20 |
| Geltone II | 0.40 | 0.40 |
| Barite | 43.0 | 43.0 |
| Duratone | 0.60 | 0.60 |
| CMC E HVT | 0.10 | 0.20 |
| Aqueous $CaCl_2$ (30%) | 25.07 | 40.93 |
| PIT/° C. | 50–53 | 49–52 |
| Stability | Sediments slowly | Sediments quickly |

Example 4

A drilling fluid based on ester oil is made up using the formulation of Example 3b and the phase inversion temperature range is determined. In the following Table, the two values measured are shown separately as PIT/° C. "upwards" for rising temperatures and as PIT/° C. "downwards" for falling temperatures.

Further samples of this multicomponent mixture are then conventionally aged by treatment for 16 hours in a roller oven. One sample (Example 4b) is aged at a temperature of 250° F. while another sample (Example 4c) is aged at a temperature of 300° F.

The respective phase inversion temperature ranges ("upwards" and "downwards") of the aged samples are then determined. The following Table shows that, although ageing has a certain effect on the PIT range, the differences remain within acceptable limits from the point of view of practical application.

|  | (a) Fresh | (b) Aged for 16 h at 250° F. | (c) Aged for 16 h at 300° F. |
|---|---|---|---|
| OMC 586 | 12.0 | 12.0 | 12.0 |
| Dehydol LT 5 | 2.7 | 2.7 | 2.7 |
| Bentonite | 0.2 | 0.2 | 0.2 |
| Geltone II | 0.4 | 0.4 | 0.4 |
| Duratone | 0.6 | 0.6 | 0.6 |
| Natrosol Plus GR 330 CS | 0.2 | 0.2 | 0.2 |
| Barite | 43.0 | 43.0 | 43.0 |
| Aqueous $CaCl_2$ (30%) | 40.9 | 40.9 | 40.9 |
| PIT/° C. (upwards) | 47–49 | 28–34 | 32–35 |
| PIT/° C. (downwards) | 44–47 | 21–22 | 23–34 |

Example 5

In the following two mixtures, the oil phase is again changed and is now a linear α-olefin "LAO ($C_{14/16}$)" which is commercially available and which is used in practice as an oil phase for w/o invert drilling fluids.

In the same way as in Example 3, two drilling fluids containing on the one hand the oil phase and water phase in a ratio of 1:1 (Example 5a) and, on the other hand, the oil phase in a drastically reduced quantity are compared with one another for the same emulsifier. The phase inversion temperature ranges determined—PIT/° C. ("upwards") and PIT/° C. ("downwards")—are associated with the particular formulations in the following Table.

|  | (a) | (b) |
|---|---|---|
| LAO $C_{14/16}$ | 25.1 | 17.0 |
| DEHYDOL LT5 | 5.6 | 3.8 |
| Bentonite | 0.2 | 0.2 |
| Geltone II | 0.4 | 0.4 |
| Duratone | 0.6 | 0.6 |
| Tylose VHR | 0.1 | 0.1 |
| Barite | 43.0 | 43.0 |
| Aqueous $CaCl_2$ (30%) | 25.0 | 35.0 |
| PIT/° C. (upwards) | 39–44 | 23–45 |
| PIT/° C. (downwards) | 39–43 | 38–42 |

Example 6

In the following mixtures, the emulsifier system is changed but the oil phase of Example 5 is retained. An emulsifier combination of a comparatively hydrophilic polyol fatty acid ester Cetiol HE with a relatively hydrophobic co-emulsifier (Dehymuls SML) is used in this Example.

Example 6a and 6b use ratios of oil phase to aqueous salt phase of 1:1 and otherwise identical quantities of additives, but vary the ratio in which the two components of the emulsifier combination are mixed. Comparison of the phase inversion temperature range is determined—PIT/° C. ("upwards") and PIT/° C. ("downwards")—shows that the PIT ranges can be distinctly increased by varying the quantity ratios between the emulsifier components. The PIT range(s) can thus be optimally adapted to meet the required standards.

As in the previous Examples, the formulation of Example 6c again varies the oil-to-water ratio towards a comparatively low-oil mixture although in this case, too, the w/o inversion range required in practice is guaranteed not only in the hot well, but also in comparatively cooler external sections of the drilling fluid circuit.

|  | (a) | (b) | (c) |
|---|---|---|---|
| LAO $C_{14/16}$ | 25.1 | 25.1 | 17.0 |
| Cetiol HE | 3.0 | 4.0 | 2.71 |
| Dehymuls SML | 2.6 | 1.6 | 1.08 |
| Bentonite | 0.2 | 0.2 | 0.2 |
| Geltone II | 0.4 | 0.4 | 0.4 |
| Duratone | 0.6 | 0.6 | 0.6 |
| Barite | 43.0 | 43.0 | 43.0 |
| Aqueous $CaCl_2$ (30%) | 25.1 | 25.1 | 35.01 |
| PIT/° C. (upwards) | 13–18 | 20–30 | 15–27 |
| PIT/° C. (downwards) | 7–9 | 20–26 | 18–22 |

Example 7

Using the emulsifier mixture of Example 6 and an oil phase based on the ester oil OMC 586, two drilling fluid systems are quantitatively adapted to one another in such a way that the phase inversion temperature of both is in the range from about 20 to 30° C.

One drilling fluid contains equal quantities of oil phase and aqueous 30% by weight calcium chloride solution (Example 7a) whereas, in the second drilling fluid, the ratio by weight of water phase to oil phase is about 2:1.

The compositions of the respective drilling fluids and the phase inversion temperature range determined—PITRC ("upwards") and PIT/° C. ("downwards")—are set out in the following Table.

|  | (a) | (b) |
|---|---|---|
| OMC 586 | 25.1 | 17.0 |
| Cetiol HE | 2.6 | 1.75 |
| Dehymuls SML | 3.0 | 2.05 |
| Bentonite | 0.2 | 0.2 |
| Geltone II | 0.4 | 0.4 |
| Duratone | 0.6 | 0.6 |
| Barite | 43.0 | 43.0 |
| Aqueous $CaCl_2$ (30%) | 25.1 | 35.0 |
| PIT/° C. (upwards) | 26–30 | 21–25 |
| PIT/° C. (downwards) | 19–21 | 18–19 |
| Stability | Sediments slowly | Sediments very slowly |

Example 8

Various drilling fluids based on known oil phases for w/o invert drilling fluids are formulated using the comparatively low-oil multicomponent mixture of Example 7b with its phase inversion temperature range of about 20 to 25° C. The viscosity data of the material are determined as follows before and after ageing:

Viscosity is measured at 50° C. in a Fann-35 viscosimeter of Baroid Drilling Fluids INC. The plastic viscosity (PV), the yield point (YP) and the gel strength (lb/100 ft$^2$) after 10 secs. and 10 mins. are determined in known manner.

The drilling fluid based on the standard formulation of Example 7b is aged by treatment in a roller oven for 16 h at 250° F.

The oil phases used in the particular formulation are identified in the following and the characteristic data as determined before and after ageing are set out in the following Table.

The multicomponent mixtures tested correspond to the following formulation:

| Oil phase | 76.5 g |
|---|---|
| Cetiol HE | 7.9 g |
| Dehymuls SML | 9.2 g |
| $CalC_2$ solution (30%) | 157.5 g |
| Bentonite | 0.9 g |
| Geltone II | 1.8 g |
| Duratone HT | 2.7 g |
| Barite | 193.5 g |

Example 8a

Rapeseed oil as a triglyceride of natural origin is used as the oil phase. The characteristic data determined before and after ageing of the material are set out in the following Table.

|  | Before Ageing | After Ageing |
|---|---|---|
| Plastic viscosity (PV) mPas | 37 | 45 |
| Yield point (YP) lb/100 ft$^2$ | 15 | 14 |
| Gel strength lb/100 ft$^2$ (10 secs.) | 6 | 8 |
| Gel strength lb/100 ft$^2$ (10 mins.) | 7 | 9 |

Example 8b

The di-n-ctyl ether Cetiol OE is used as the oil phase. The characteristic data determined before and after ageing of the material are as follows:

|                                         | Before Ageing | After Ageing |
|-----------------------------------------|---------------|--------------|
| Plastic viscosity (PV) mPas             | 59            | 51           |
| Yield point (YP) lb/100 ft$^2$          | 24            | 19           |
| Gel strength lb/100 ft$^2$ (10 secs.)   | 5             | 5            |
| Gel strength lb/100 ft$^2$ (10 mins.)   | 7             | 6            |

Example 8c

Isotridecyl alcohol is used as the continuous oil phase. The values determined for the system are as follows:

|                                         | Before Ageing | After Ageing |
|-----------------------------------------|---------------|--------------|
| Plastic viscosity (PV) mPas             | 37            | 20           |
| Yield point (YP) lb/100 ft$^2$          | 18            | 8            |
| Gel strength lb/100 ft$^2$ (10 secs.)   | 6             | 4            |
| Gel strength lb/100 ft$^2$ (10 mins.)   | 6             | 4            |

Example 8d

The oil phase used in this Example is the commercial product XPO7 of Baroid, a free-flowing oil phase based on saturated paraffins.

The values determined are set out in the following Table:

|                                         | Before Ageing | After Ageing |
|-----------------------------------------|---------------|--------------|
| Plastic viscosity (PV) mPas             | 50            | 42           |
| Yield point (YP) lb/100 ft$^2$          | 15            | 16           |
| Gel strength lb/100 ft$^2$ (10 secs.)   | 4             | 5            |
| Gel strength lb/100 ft$^2$ (10 mins.)   | 5             | 6            |

Example 8e

In this Example, an α-olefin $C_{14/16}$ (70/30) of the LAO type is used as the oil phase The characteristic data of the material before and after ageing are as follows

|                                         | Before Ageing | After Ageing |
|-----------------------------------------|---------------|--------------|
| Plastic viscosity (PV) mPas             | 50            | 46           |
| Yield point (YP) lb/100 ft$^2$          | 15            | 18           |
| Gel strength lb/100 ft$^2$ (10 secs.)   | 4             | 5            |
| Gel strength lb/100 ft$^2$ (10 mins.)   | 5             | 10           |

Example 8f

The ester oil OMC 586 is used as the oil phase in this Example. The characteristic data of the material before and after ageing are as follows:

|                                         | Before Ageing | After Ageing |
|-----------------------------------------|---------------|--------------|
| Plastic viscosity (PV) mPas             | 66            | 67           |
| Yield point (YP) lb/100 ft$^2$          | 25            | 25           |

|                                         | Before Ageing | After Ageing |
|-----------------------------------------|---------------|--------------|
| Gel strength lb/100 ft$^2$ (10 secs.)   | 5             | 6            |
| Gel strength lb/100 ft$^2$ (10 mins.)   | 6             | 6            |

Example 9

Under the headings Examples 9a, 9b and 9c, the following Table sets out formulations for drilling emulsions in which the oil phase is formed by the ester oil OMC 586 together with a 30% aqueous solution of $CaCl_2$. The particular emulsifier mixtures used of the principal emulsifier component and the co-emulsifier together with the other typical ingredients of the drilling emulsions are set out in the following Table where they are assigned to Examples 9a to 9c. Finally, the PIT ranges of the various multicomponent mixtures are shown in the Table.

| Examples              | 9a    | 9b    | 9c    |
|-----------------------|-------|-------|-------|
| OMC 586               | 26.50 | 25.10 | 17.00 |
| Eumulgin EP 4         | 3.90  |       |       |
| RS 1100               |       | 2.60  | 1.75  |
| Dehymuls SML          | 2.02  | 3.00  | 2.05  |
| Bentonite             | 0.23  | 0.20  | 0.20  |
| Geltone II            | 0.64  | 0.40  | 0.40  |
| Duratone HT           | 1.03  | 0.60  | 0.60  |
| Barite                | 36.18 | 43.0  | 43.0  |
| Ca(OH)$_2$            | 0.08  |       |       |
| CaCl$_2$ solution (30%) | 29.42 | 25.10 | 35.00 |
| PIT/° C. (upwards)    | 27–36 | 22–30 | 22–26 |
| PIT/° C. (downwards   |       | 19–26 | 18–19 |

Example 10

The mixtures of this Example—10a to 10g—all use a commercial w/o invert emulsifier (EzMul NTE, a product of Baroid, Aberdeen) as co-emulsifier. This w/o invert emulsifier is widely used in invert drilling fluids.

The co-emulsifier is combined with various principal emulsifier components corresponding to the definition according to the invention. The following oil phases are used—in each case together with 30% by weight aqueous calcium chloride solution:

Example 10a

Mineralöl Ha-359

Examples 10b to 10e

Esteröl OMC 586

Examples 10f and 10g

Linear α-olefin (LAO $C_{14/16}$ (70/30))

Typical ingredients of drilling emulsions as listed in the following Table (type and quantity) are mixed into together with these components. The phase inversion temperature ranges determined (PIT/° C.) are also shown in the Table.

| Examples | 10a | 10b | 10c | 10d | 10e | 10f | 10g |
|---|---|---|---|---|---|---|---|
| OMC 586 | | 26.50 | 26.50 | 22.69 | 25.60 | | |
| Mineralöl Ha-359 | 26.50 | | | | | | |
| LAO $C_{14/16}$ (70/30) | | | | | | 25.10 | 17.00 |
| Lutensol T07 | 4.20 | | | | 3.30 | 3.50 | 2.37 |
| $C_{10-18}$ - 9EO carbonate | | 4.92 | | | | | |
| Dehydol 980 | | | 2.80 | | | | |
| $C_{12}$ Guerbet alcohol - 6E0 | | | | 5.83 | | | |
| Ez-Mul NTE as co-emulsifier | 1.72 | 1.00 | 3.12 | 3.90 | 2.62 | 2.10 | 1.43 |
| Bentonite | 0.23 | 0.23 | 0.23 | 0.23 | 0.23 | 0.20 | 0.20 |
| Geltone II | 0.64 | 0.64 | 0.64 | 0.64 | 0.64 | 0.40 | 0.40 |
| Duratone HT | 1.03 | 1.03 | 1.03 | 1.03 | 1.03 | 0.60 | 0.60 |
| Bante | 36.18 | 36.18 | 36.18 | 36.18 | 36.18 | 43.00 | 43.00 |
| Ca(OH): | 0.08 | 0.08 | 0.08 | 0.08 | 0.08 | | |
| $CaCl_2$ solution (30%) | 29.42 | 29.42 | 29.42 | 29.42 | 29.42 | 25.10 | 35.00 |
| PIT/° C. (upwards) | 14–24 | 35–41 | 24–32 | 30–34 | 23–28 | 22–29 | 33–38 |
| PIT/° C. (downwards) | | | | | | 21–29 | 23–24 |

Example 11

In five test mixtures using the ester oil phase OMC 586 and a 30% by weight aqueous calcium chloride solution as liquid phase, the particular oil-to-water ratios (% by volume) used are varied as follows: 40:60, 50:50, 60:40, 70:30, 80:20.

In every case, a mixture of Lutensol T05 as principal emulsifier component and EZ-Mul NTE as co-emulsifier is used as the emulsifier system.

The quantities in which the five mixtures tested are present in the test formulation are set out in the following Table. The plastic viscosity (PV in mPas), yield point (YP in lb/100 ft$^2$) and gel strength (gel 10"/10' in lb/100ft$^2$) of these multicomponent mixtures are then determined before ageing (BHR) and after ageing (AHR). The various drilling fluids are conventionally aged for 16 hours at 250° F. in a roller oven. The viscosity data are also conventionally determined, cf. Example 8.

Example 12

The following Table shows series of tests according to the invention using emulsifier systems which contain APG compounds as part of the principal emulsifier component(s) or as sole principal emulsifier component. The $C_{12/16}$ APG product marketed by applicants as APG 600 is used as the APG component. The products used contain 51% by weight of active substance. In both cases, the co-mulsifier used is again the commercial w/o invert emulsifier Ez-Mul NTE.

The following Table shows the composition of the drilling emulsions in % by weight and the phase inversion temperature ranges (PIT/° C. upwards).

| | Example 12a | Example 12b | Example 12c | Example 12d |
|---|---|---|---|---|
| OMC 586 | 26.50 | 26.50 | 26.5 | 26.5 |
| Lutensol T05 | 1.65 | | | |
| APG 600 | 1.65 | 3.30 | 5.12 | 5.70 |

Table for Example 11

| | A | B | C | D | E |
|---|---|---|---|---|---|
| CMC 586 (g) | 68.5 | 85.6 | 102.6 | 119.8 | 136.9 |
| Lutensol TO5 (g) | 8.53 | 10.65 | 12.77 | 14.91 | 17.04 |
| Ez-Mul NTE(g) | 6.76 | 8.45 | 10.13 | 11.83 | 13.52 |
| $CaCl_2$ solution (30%) (g) | 170.6 | 142.2 | 113.9 | 85.29 | 56.86 |
| Bentonite (g) | 0.9 | 0.9 | 0.9 | 0.9 | 0.9 |
| Geltone II (g) | 2.5 | 2.5 | 2.5 | 2.5 | 2.5 |
| Duratone HT (g) | 4 | 4 | 4 | 4 | 4 |
| Lime (g) | 0.3 | 0.3 | 0.3 | 0.3 | 0.3 |
| Bante (g) | 107.8 | 123.8 | 140.1 | 156.7 | 169.1 |
| O/w ratio % by volume | 40 60 | 50:50 | 60:40 | 70:30 | 80:20 |

| | BHR | AHR | BHR | AHR | BHR | AHR | BHR | AHR | BHR | AHR |
|---|---|---|---|---|---|---|---|---|---|---|
| PV (mPas) | 73 | 10 | 69 | 55 | 45 | 44 | 30 | 30 | 20 | 23 |
| YP (lb/100 ft$^2$) | 35 | 1 | 24 | 20 | 10 | 9 | 3 | 6 | 5 | 4 |
| Gel strength 10"/10' (lb/100 ft$^2$) | 6/7 | 3/3 | 5/5 | 4/4 | 3/3 | 4/5 | 3/3 | 3/4 | 2/2 | 3/4 |
| PIT/° C. (upwards) | | 30–41 | | 25–31 | | 23–26 | | 23–29 | | 21–23 |
| PIT/° C. (downwards) | | 23–25 | | 23–28 | | 26–28 | | 23–30 | | 22–24 |

-continued

|  | Example 12a | Example 12b | Example 12c | Example 12d |
|---|---|---|---|---|
| Ez-Mul NTE | 2.62 | 2.62 | 3.30 | 3.00 |
| Bentonite | 0.23 | 0.23 | 0.23 | 0.23 |
| Geltone II | 0.64 | 0.64 | 0.64 | 0.64 |
| Duratone HT | 1.03 | 1.03 | 1.03 | 1.03 |
| Bante | 36.18 | 36.18 | 36.18 | 36.18 |
| Ca(OH)$_2$ | 0.08 | 0.08 | 0.08 | 0.08 |
| CaCl$_2$ solution (30%) | 29.42 | 29.42 | 26.92 | 26.64 |
| PIT/° C. (upwards) | 20–22 | 46–49 | 10.6–14.7 | 22.4–27.5 |
| PIT/° C. (downwards) |  |  | 9.9–14.3 | 22.0–7.0 |
| Stability | Sediments slowly | Sediments slowly |  |  |

Example 13

Invert emulsion drilling muds using rapeseed oil as a triglyceride of natural origin are investigated in further tests. Example 13a uses rapeseed oil as the sole component of the oil phase. Example 13b uses a mixture of 1 part by weight of rapeseed oil and slightly more than 4 parts by weight of the ester oil OMC 586 as the oil phase.

The composition by weight (in g) of the two tested emulsions can be found in the following Table. As in Example 8, both drilling emulsions are aged for 16 hours at 250° F. and are then tested at 50° C. to determine their key rheological data in the same way as described in Example 8. The values determined before ageing (BHR) and after ageing (AHR) are assigned to the respective drilling emulsions in the following Table.

Finally, the PIT ranges determined are assigned to the fresh and aged drilling emulsions. The figures shown represent the temperatures at which the conductivity reaches 0 ms/cm.

Table for Examples 13a and 13b

|  | A | B |
|---|---|---|
| OMC 586 (g) |  | 82.6 |
| Rapeseed oil (g) | 102.6 | 20 |
| Lutensol T05 (g) | 12.77 | 12.77 |
| Ez-Mul NTE (9) | 10.13 | 10.13 |
| CaCl$_2$ solution (30%) (g) | 113.9 | 113.9 |
| Bentonite (g) | 0.9 | 0.9 |
| Geltone II (g) | 2.5 | 2.5 |
| Duratone HT (g) | 4 | 4 |
| Lime (g) | 0.3 | 0.3 |
| Barite (g) | 140.1 | 140.1 |

|  | BHR | AHR | BHR | AHR |
|---|---|---|---|---|
| PV (mPas) | 58 | 53 | 64 | 64 |
| YP (lb/100 ft$^2$) | 7 | 7 | 38 | 37 |
| Gel strength 10"/10' (lb/100 ft$^2$) | 5/12 | 6/7 | 19/9 | 18/16 |
| PIT/° C. (upwards) | 57.4 | 61.9 | 30 | 32.9 |

Example 14

To determine the cleaning performance of the process according to the invention, solids are wetted with invert drilling muds and then treated in a centrifuge.

Quantities of 10 g of clay cuttings (mean particle size 1–5 mm) are immersed in 100 ml of invert drilling muds 14a (normal invert mud) and 14b (mud with PIT of 40° C.) for 15 minutes at 50° C. The composition of the drilling muds is set out in Table 14.

The cuttings are then placed on a sieve where they are left to drip for 1 minute with occasional shaking. The oil-covered cuttings are then weighed to determine the quantity of adhering drilling mud. The cuttings are then placed in a centrifuge tube at the bottom of which is a 2 cm thick wad of cotton to absorb the mud removed by centrifuging. The cuttings are then centrifuged for 1.5 mins. at 1800 min$^{-1}$.

The residue of hydrophobic components (mainly ester and possibly emulsifier) is then removed from the surface of the cuttings by extraction with methylene chloride. The methylene chloride fraction is concentrated by evaporation. The hydrophobic components remain in the residue.

The quantity of hydrophobic components extracted amounted to 10% by weight (based on the quantity of mud originally adhering to the cuttings) in the case of mud 14a but to only 5% by weight in the case of mud 14b.

TABLE 14

| Drilling mud A (normal invert mud): | |
|---|---|
| OMC 586 | 250 ml |
| EZ-Mul NTE | 12 g |
| Duratone HT | 16 g |
| Geltone II | 1.0 g |
| Lime | 2.0 g |
| Aqueous CaCl$_2$ (30%) | 80 ml |
| Barite | 200 g |
| Drilling mud B (drilling mud with a PIT of 40° C.) | |
| OMC 586 | 176 ml |
| Lutensol TO 7 | 14 g |
| EZ-Mul NTE | 1.8 g |
| Bentonite | 0.9 g |
| Geltone II | 1.8 g |
| Duratone HT | 2.7 g |
| Aqueous CaCl$_2$ (30%) | 130 ml |
| Barite | 193 g |

What is claimed is:

1. A process for facilitating the removal of a working fluid used in a geological exploration from a solid surface comprising:
   (a) forming a working fluid comprising an aqueous phase, an oil phase, and an emulsifier;
   (b) circulating said working fluid in a geological exploration wherein the working fluid attains a temperature above its phase inversion temperature and contacts a solid surface;
   (c) cooling said working fluid in contact with said solid surface to a temperature above the freezing point of the aqueous phase and within or below the phase inversion temperature range of the working fluid; and
   (d) removing the working fluid from said solid surface.

2. The process of claim 1 wherein the emulsifier comprises a nonionic emulsifier.

3. The process of claim 1 wherein the emulsifier comprises an ecologically compatible emulsifier.

4. The process of claim 1 wherein the emulsifier comprises a hydrophilic primary emulsifier and a lipophilic co-emulsifier.

5. The process of claim 4 wherein the primary emulsifier has an HLB value of 6 to 20 and the co-emulsifier has an HLB value lower than that of said primary emulsifier.

6. The process of claim 4 wherein the primary emulsifier has an HLB value of 7 to 18.

7. The process of claim 4 wherein the primary emulsifier and co-emulsifier are selected from the group consisting of oligoalkoxylates, alkyl polyglycosides of long-chain alcohols, fatty alcohols, oligoaminoamides of anionically modified long-chain fatty acids, alkylolamides, amine oxides and lecithins.

8. The process of claim 1 wherein the working fluid attains a temperature of at least 3° C. above its phase inversion temperature in the geological exploration.

9. The process of claim 8 wherein the working fluid attains a temperature of at least 10° C. above its phase inversion temperature in the geological exploration.

10. The process of claim 9 wherein the working fluid attains a temperature of at least 15° C. above its phase inversion temperature in the geological exploration.

11. The process of claim 10 wherein the working fluid attains a temperature of at least 20° C. above its phase inversion temperature in the geological exploration.

12. The process of claim 11 wherein the working fluid attains a temperature of at least 30° C. above its phase inversion temperature in the geological exploration.

13. The process of claim 1 wherein the phase inversion temperature of the working fluid is above 0° C.

14. The process of claim 13 wherein the phase inversion temperature of the working fluid is above 5° C.

15. The process of claim 14 wherein the phase inversion temperature of the working fluid is above 10° C.

16. The process of claim 15 wherein the phase inversion temperature of the working fluid is above 15° C.

17. The process of claim 16 wherein the phase inversion temperature of the working fluid is above 20° C.

18. The process of claim 1 wherein the phase inversion temperature of the working fluid is 120° C. or less.

19. The process of claim 18 wherein the phase inversion temperature of the working fluid is 100° C. or less.

20. The process of claim 19 wherein the phase inversion temperature of the working fluid is 90° C. or less.

21. The process of claim 20 wherein the phase inversion temperature of the working fluid is 80° C. or less.

22. The process of claim 21 wherein the phase inversion temperature of the working fluid is 60° C. or less.

23. The process of claim 22 wherein the phase inversion temperature of the working fluid is 50° C. or less.

24. The process of claim 23 wherein the phase inversion temperature of the working fluid is 40° C. or less.

25. The process of claim 1 wherein the phase inversion temperature of the working fluid is 5 to 80° C.

26. The process of claim 25 wherein the phase inversion temperature of the working fluid is 10 to 60° C.

27. The process of claim 26 wherein the phase inversion temperature of the working fluid is 15 to 50° C.

28. The process of claim 27 wherein the phase inversion temperature of the working fluid is 20 to 35° C.

29. The process of claim 25 wherein the phase inversion temperature of the working fluid is 15 to 80° C.

30. The process of claim 29 wherein the phase inversion temperature of the working fluid is 20 to 60° C.

31. The process of claim 30 wherein the phase inversion temperature of the working fluid is 25 to 50° C.

32. The process of claim 1 wherein the temperature of the circulating working fluid remains above the phase inversion temperature both in and outside the geological exploration.

33. The process of claim 1 comprising removing the working fluid from the solid surface by centrifuge, decanter or cyclone.

34. The process of claim 1 wherein the working fluid in contact with said solids is cooled to below the phase inversion temperature.

35. The process of claim 1 wherein the working fluid is removed from the solid surface by washing with an aqueous-based washing aid.

36. The process of claim 35 wherein the washing is accelerated by mechanical energy.

37. The process of claim 36 wherein the mechanical energy is applied by a spray wash.

38. The process of claim 37 wherein the spray wash is an excess-pressure spray wash.

39. The process of claim 38 wherein the spray wash is applied by means of a multi-component nozzle of the type used for pneumatic spraying.

40. The process of claim 35 comprising a multiple stage washing.

41. The process of claim 40 wherein the duration of each wash stage is less than 1 minute.

42. The process of claim 41 wherein the duration of each wash stage is 1 to 10 seconds.

43. The process of claim 42 wherein the duration of each wash stage is 1 to 5 seconds.

44. The process of claim 35 wherein the duration of the washing is 20 to 40 seconds.

45. The process of claim 35 wherein the aqueous-based washing aid comprises cold water having a temperature below that of the working fluid phase inversion temperature.

46. The process of claim 36 wherein the aqueous-based washing aid comprises sea water.

47. The process of claim 1 wherein the solid surface is a rock cutting.

48. The process of claim 1 further comprising disposing of the working fluid.

49. The process of claim 48 comprising disposing of the working fluid in contact with the solid surface directly into seawater.

50. The process of claim 1 further comprising separating the working fluid into the oil phase and aqueous phase for reuse following removal from the solid surface.

51. The process of claim 1 wherein the working fluid comprises greater than 1 percent by weight emulsifier based on the oil phase.

52. The process of claim 51 wherein the working fluid comprises 5 to 60 percent by weight emulsifier based on the oil phase.

53. The process of claim 52 wherein the working fluid comprises 10 to 50 percent by weight emulsifier based on the oil phase.

54. The process of claim 53 wherein the working fluid comprises 15 to 40 percent by weight emulsifier based on the oil phase.

55. The process of claim 54 wherein the working fluid comprises 20 to 35 percent by weight emulsifier based on the oil phase.

56. The process of claim 24 wherein the oil phase is selected from the group consisting of saturated hydrocarbons, olefinically unsaturated hydrocarbons, aromatic hydrocarbons, naphthenes, carboxylic acid esters of monohydric or polyhydric alcohols, ethers, acetals, carbonic acid esters, fatty alcohols, silicone oils, oligoamides, oligoimides and oligoketones.

57. The process of claim 1 wherein the oil phase comprises a triglyceride.

58. The process of claim 1 wherein the volume ratio of the aqueous phase to the oil phase is from 90:10 to 10:90.

59. The process of claim 58 wherein the volume ratio of the aqueous phase to the oil phase is from 85:15 to 20:80.

60. The process of claim 1 wherein the working fluid comprises at least 30 percent by volume aqueous phase.

61. The process of claim 60 wherein the working fluid comprises at least 35 percent by volume aqueous phase.

62. The process of claim 61 wherein the working fluid comprises at least 40 percent by volume aqueous phase.

63. The process of claim 62 wherein the working fluid comprises at least 50 percent by volume aqueous phase.

64. The process of claim 63 wherein the working fluid comprises at least 80 percent by volume aqueous phase.

65. The process of claim 63 wherein the working fluid comprises 55 to 85 percent by volume aqueous phase.

66. The process of claim 65 wherein the working fluid comprises 60 to 80 percent by volume aqueous phase.

67. The process of claim 1 wherein the working fluid comprises a thixotropic thickener.

68. The process of claim 1 wherein the working fluid has a plastic viscosity of less than 100 mPas and a yield point of not more than 80 lb/100 ft$^2$ at a temperature 10 to 15° C. above the phase inversion temperature of said working fluid.

69. The process of claim 68 wherein the working fluid has a plastic viscosity of less than 86 mPas and a yield point of not more than 50 lb/100 ft$^2$ at a temperature 10 to 150C above the phase inversion temperature of said working fluid.

70. The process of claim 69 wherein the working fluid has a plastic viscosity of 30 to 45 mPas and a yield point of 10 to 25 lb/10o ft$^2$ at a temperature 10 to 15° C. above the phase inversion temperature of said working fluid.

* * * * *